United States Patent [19]

Eicher

[11] Patent Number: 4,860,359
[45] Date of Patent: Aug. 22, 1989

[54] METHOD OF VOICE OPERATED TRANSMIT CONTROL

[75] Inventor: David E. Eicher, Cedar Rapids, Iowa

[73] Assignee: Rockwell International Corporation, El Segundo, Calif.

[21] Appl. No.: 660,822

[22] Filed: Oct. 15, 1984

[51] Int. Cl.$^4$ .............................................. G10L 7/08
[52] U.S. Cl. ........................................ 381/46; 455/79
[58] Field of Search ................................ 381/31-33, 381/46-47, 110, 29-30; 455/78-79; 375/7; 370/32; 379/389

[56] References Cited

U.S. PATENT DOCUMENTS

| | | | |
|---|---|---|---|
| 3,169,221 | 2/1965 | Franchi | 455/79 |
| 4,052,562 | 10/1977 | Anderson | 370/32 |
| 4,052,568 | 10/1977 | Jankowski | 381/46 |
| 4,110,560 | 8/1978 | Leary et al. | 381/31 |
| 4,305,154 | 12/1981 | Deman et al. | 455/79 |
| 4,426,733 | 1/1984 | Brenig | 455/79 |
| 4,462,080 | 7/1984 | Johnstone et al. | 364/513.5 |
| 4,604,501 | 8/1986 | Richmond et al. | 381/110 |

FOREIGN PATENT DOCUMENTS 2139052A 11/1984 United Kingdom .

Primary Examiner—Gary V. Harkcom
Assistant Examiner—John A. Merecki
Attorney, Agent, or Firm—George A. Montanye; John C. McFarren; H. Fredrick Hamann

[57] ABSTRACT

A system and technique for enabling voice activation of an audio transmission system includes circuitry for storing and delaying an audio input signal, which may include a voice signal, and computer analysis of the input signal to determine voice input in accordance with predetermined parameters. The computer analysis includes programmed sampling of the input signal in response to a plurality of adjustable criteria to enable the analysis to be tailored for a variety of environments while producing reliable voice activation. Upon detection of a voice signal on the input in response to the computer analysis, the previously-stored audio signal is provided as output to be transmitted by the transmission system. Computer control of the system is also utilized to provide unkeying of the transmission following termination of the voice signal.

2 Claims, 4 Drawing Sheets

METHOD OF VOICE OPERATED TRANSMIT CONTROL

BACKGROUND OF THE INVENTION

The present invention relates to transmission systems and more particularly to voice operated transmit (VOX) control of audio information transmission.

There are known in the prior art a variety of voice-activated systems which initiate and terminate the transmission of audio information based upon the voice signal input to the microphone of a transmitter. In such systems, the input signal received by a microphone is usually compared in a threshold circuit designed to detect the presence of signals representing human speech. Thereafter, upon the detection of the presence of speech, a conventional radio transmitter, or similar transmission device, is activated to transmit the audio received by the microphone.

While such prior art systems have been in use for some time, the same are subject to various problems which limit their usefulness and versatility in various environments and prevent their efficient operation under a variety of circumstances. In particular, once the hardware has been configured to detect a certain feature of the voice signal, any reception of that signal by the transmitting microphone will cause keying of the transmission system to initiate audio transmission. Thus, if the environment in which the voice is to be transmitted contains noise or other sources of signals containing the same components detected by the voice detection circuitry, the voice operated system will key on that same signal. Because various environments contain background noise which may include signals similar to that on which the voice activation is determined, there is high probability that the system will be keyed during times when no voice is being provided to the microphone. In the same manner, unkeying of the system may be prevented following the termination of the audio transmission because of the presence of similar signals in the background or environment which are detected by the microphone and maintain the system in a keyed condition.

The consequences of the above operation result in systems which are slow to key and slow to unkey, thereby producing undesirable operating conditions. Thus, an audio transmission may be keyed when no voice is actually present at the transmitter, and may continue to be keyed following removal of the voice from the transmitter. Because of the limited adjustments that can be made in the hardware of conventionally employed detection circuitry, any attempt to narrow the response of the voice detection circuitry to limit unwanted keying usually produces a high rate of inaccuracy resulting in a failure to key on a voice signal or necessitates the use of the circuitry in only low noise environments. As a result, use of VOX systems is discouraged in favor of the more common manual keying systems of the prior art.

In an effort to improve efficiency and eliminate the required manual keying in a variety of audio systems, there is a continuing need for improved voice detection and control circuitry capable of enabling voice operated control. Accordingly, the present invention has been developed to overcome the specific shortcomings of the above known and similar techniques and to provide a voice operated transmit control system having improved reliability and versatility for voice activation.

SUMMARY OF THE INVENTION

In accordance with the present invention, there is disclosed a voice operated transmit control for a voice transmission system which includes programmable computer control for voice signal analysis. In one embodiment of the system, the input from a microphone or audio detector is compared with an anti-VOX signal to provide threshold inhibiting of an audio input signal during receipt of an external transmission. A comparator compares the anti-VOX and audio input signal line to provide a voice trigger signal output during times when no external transmission is being received, and during the time that the system is keyed for voice transmission. The voice trigger signal is made available to the program for examination through an input output (I/O) circuit in the computer. The audio input signal is coupled into the circuitry for digitizing and delay prior to audio transmission. The voice trigger signal is coupled through the input/output circuitry and analyzed in accordance with a computer program to determine the presence of a voice signal at the input to the microphone. Upon the detection of a voice at the microphone, the previouslydigitized and delayed audio signal is provided simultaneously with a system key to allow transmission of the audio signal without loss of information.

Under the control of the computer program, the audio input signal is analyzed on a cyclic basis to provide a faster response to the initial presence of a voice signal at the microphone and to the continued presence of that voice signal. The program also provide a controllable delay which continually tests and decrements time in response to a detection of the termination of a voice signal at the input to the microphone to provide unkeying of the system. The programming includes multiple control loops which continuously cycle and examine the audio input signal in response to adjustable criteria that allow the system to be tailored to the environment in which the transmitter may be operated. Changes in the system may be easily accommodated by alterations in the program and related hardware variables to achieve high noise immunity and rapid, accurate response to voice signal detection for keying and unkeying of the system. The system can be programmed to reject general background noise or to reject specific signals that are present at a transmitting site.

It is therefore a feature of the invention to provide an improved voice operated transmit control in an audio transmission system.

It is a further feature of the invention to provide a voice operated control in a voice transmission system which reduces the likelihood of lost voice information and improves system keying and unkeying response times.

A still further feature of the invention is to provide a voice operated transmit control which provides a delay of voice data during voice signal analysis to prevent loss of voice signal information in any transmission.

Still another feature of the invention is to provide a voice operated control system which provides programmable computer analysis of the voice signal for providing system keying and unkeying.

Yet another feature of the invention is to provide a voice operated control system which provides a programmable delay for unkeying the system in response to computer analysis of the voice signal.

Still another feature of the invention is to provide a voice operated transmit control system which provides digitized voice information which is delayed to allow programmable analysis for almost any duration that is required to either detect or reject critical or specific features of the signal prior to issuing a key to the system.

Still another features of the invention is to provide, depending on the application, sufficient computing time to allow extensive control functions to be performed by the computer in addition to implementing the VOX function.

Yet a further feature of the invention is to provide a voice operated control system which may be easily implemented using conventional integrated circuit techniques and general purpose computer control.

These and other advantages and novel features of the invention will become apparent from the following description when considered in connection with the accompanying drawings wherein:

DETAILED DESCRIPTION OF A PREFERRED EMBODIMENT

Figure 1:
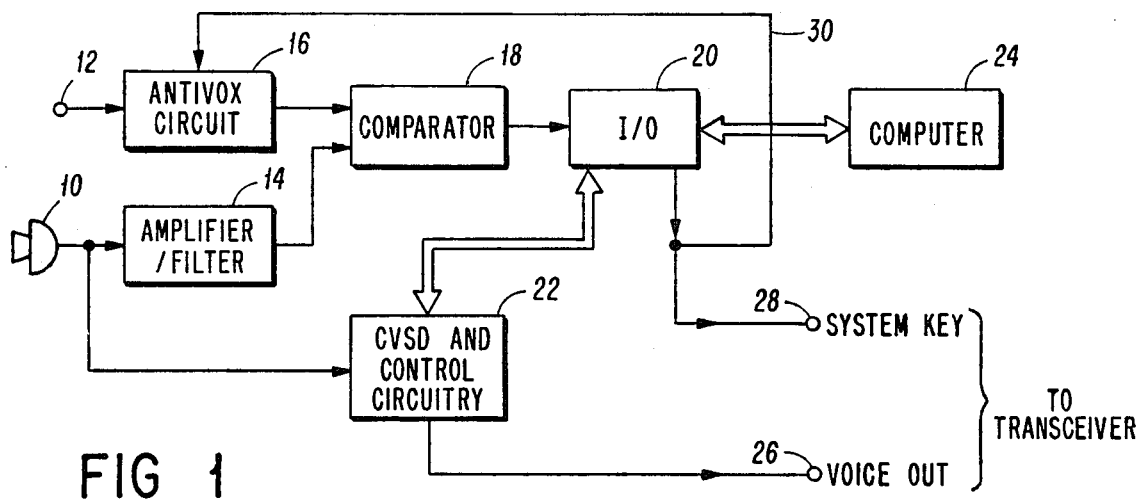
FIG. 1 is a block diagram of the voice operated transmit control system in accordance with the present invention.

Referring now to the drawings wherein like numerals are used to refer to like elements throughout, there is disclosed a voice operated transmit (VOX) control system in accordance with the present invention. The system includes a microphone 10 which forms the element that generates the electrical signal representing the audio information present at the microphone 10. The output of microphone 10 is an analog signal representing that audio information. The microphone 10 could, alternatively, be any similar speaker or audio detector as may be used in a variety of environments that may employ a voice-operated feature.

The electrical signal representing the audio signal input to the microphone 10 is coupled via an amplifier/filter 14 to a comparator 18. At the same time, the electrical signal from microphone 10 is coupled to a conventional continuously variable slope delta modulator/demodulator (CVSD) and control circuit 22 which digitizes the analog signal representing the audio information and delays its output in accordance with the control exercised by a programmable computer 24 through an input/output (I/O) circuit 20. The digitized audio is ultimately provided at terminal 26 as an output of circuit 22.

The amplifier and filtered electrical signal from 14 is compared in comparator 18 with an anti-VOX signal at terminal 12 which is coupled through circuit 16 as a second input to comparator 18. The anti-VOX signal is typically a signal representing received audio from an external transmitter, indicating that another party is transmitting at that time. This received transmission signal is amplified and filtered through circuit 16 and used in comparator 18 to prevent a voice signal from keying the transmission system during receipt of another transmission. The output from comparator 18, which forms a trigger signal representing the voice signal produced at microphone 10, is coupled through conventional input/output circuitry 20 to be analyzed by the computer 24 for detection of a voice signal in the audio input to microphone 10.

Upon detection of a voice signal by the computer 24, the previously-stored digitized audio provided through CVSD and control circuitry 22 is coupled as output to the terminal 26 for transmission. Simultaneous with that output (or at any time before or after at the programmer's discretion), the computer 24 causes a signal to appear at terminal 28 which keys the system for transmission of the previously-stored digitized audio signals provided at terminal 26. Both the system key signal at terminal 28 and the digitized audio information at terminal 26 may be provided to a conventional transceiver system of any configuration to accomplish the transmission. A detailed description of such transceiver and its operation is unnecessary to a further understanding of the voice-operated control used to key and unkey the transceiver in accordance with the present invention, it being understood that any conventional transceiver or equivalent structure for providing the transmission could be employed.

The same system key signal provided at terminal 28 is also provided over line 30 to the anti-VOX circuit 16. The purpose of the signal on line 30 is to cause grounding of any anti-VOX signal into the comparator 28 when the system is keyed. This removes any chance that the audio sidetone feedback from the transmitted signal will cause the system to unkey while audio information is being transmitted. It thus maintains a keyed voice operated system once the system has been initially keyed.

Figure 2A:
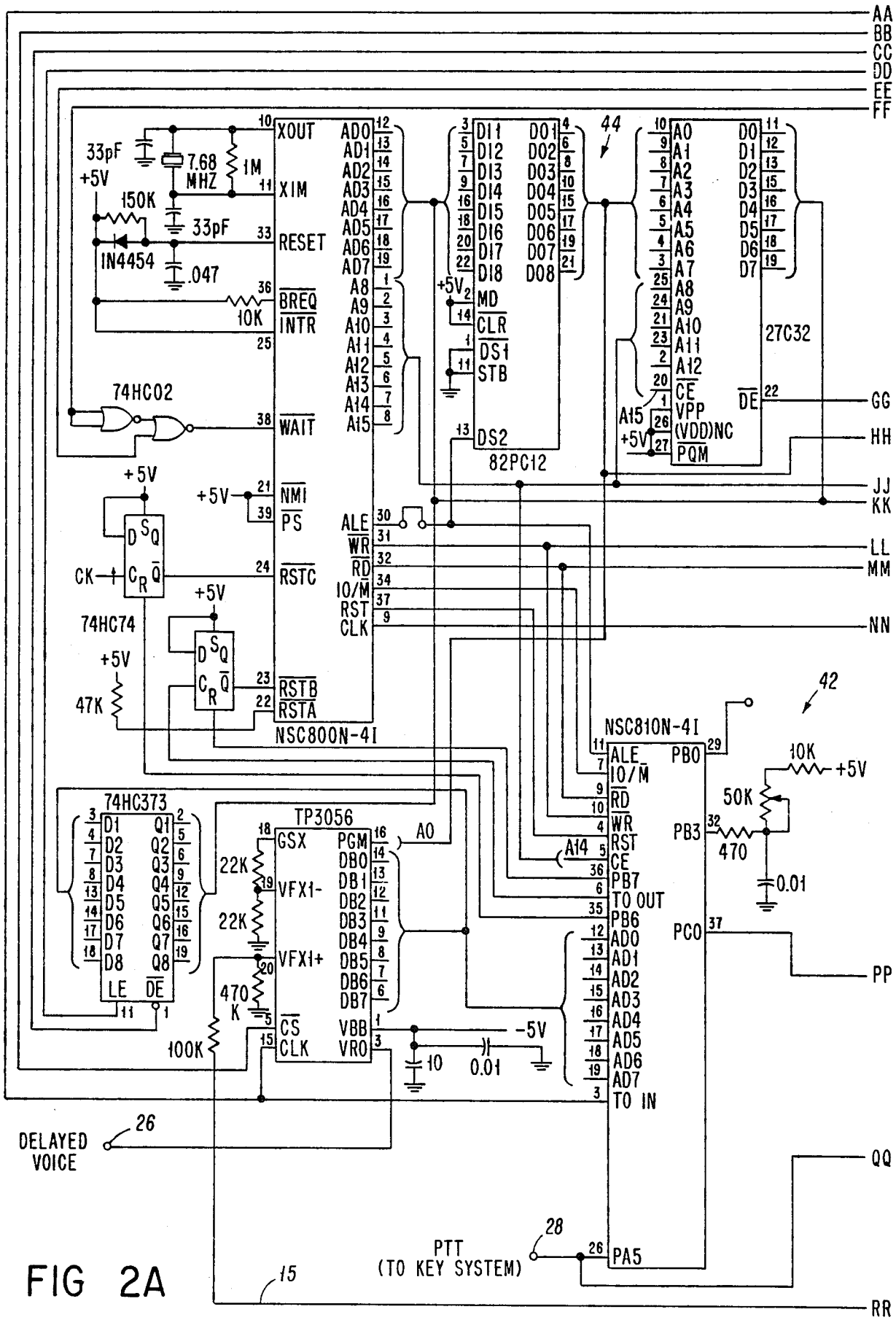
FIGS. 2A and 2B are detailed diagrams of exemplary embodiments of circuitry which may be used to implement the voice control of the system of FIG. 1.
Figure 2B:
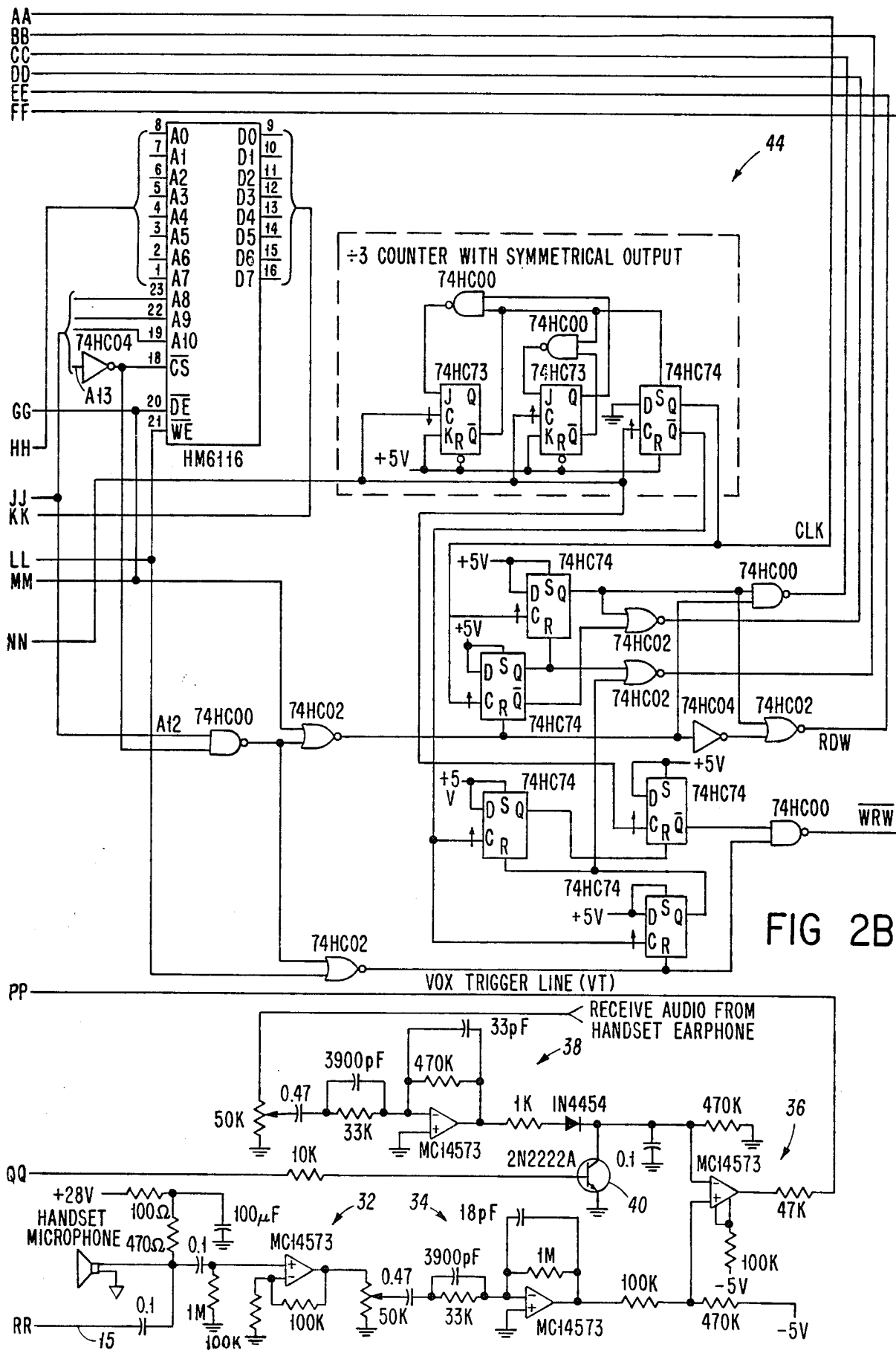

Referring now to FIGS. 2A and 2B, there is shown one embodiment of detailed activity that may be used to implement the voice-operated transmit control depicted in FIG. 1. Each of the individual circuits and components shown in FIGS. 2A and 2B are as specifically designated in the drawings and are interconnected as shown in those drawings. The component values (resistance in ohms and capacitance in microfarads, unless otherwise indicated) and interconnections are exemplary of those necessary to obtain an operable embodiment with the specific circuitry illustrated in the drawings. It should be appreciated, however, that other circuit implementations could be employed to accomplish the same functions and objectives described herein and consistent with the voice-operated control. As a result, the particular circuits will only be briefly described with respect to their function in implementing one example of a detailed embodiment incorporating the inventive techniques, it being apparent that other conventional and equivalent circuits could be employed.

More particularly, the voice-operated transmit (VOX) control is implemented using both hardware and software in connection with the control exercised by computer 24. Specifically, the software set forth in Appendix A, written in NSC800 assembly language and executed on the NSC800-based computer will produce the detection and control necessary to provide the voice-operated implementation of the present control system. The programs of Appendix A implement one example of the analysis and control exercised by computer 24 to enable a more accurate and versatile determination of voice activation in an audio transmission system.

The particular circuitry illustrated in FIGS. 2A and 2B is sufficient to provide the VOX control with information necessary for the processor and program to perform the voice detection and control function. In the present example, the system was implemented in connection with a telephone adapter for a voice privacy unit, but it is apparent that it could be used in connection with any other transceiver or transmission system as may be required. The telephone adapter was required to determine when an operator was talking so that a key could be issued to the transceiver for transmitting a voice message. In the illustrated system, the operator's voice must be delayed during the time it takes to key the system, and for any additional period necessary for the transceiver to accomplish collateral functions, before the voice is actually transmitted. Each of these features will be described in greater detail below in connection with a detailed description of the computer and programming control.

Referring now to FIGS. 1 and 2, the microphone 10 provides the audio input to the system for digitization and analysis to determine the presence of a voice signal. As will be appreciated, the microphone 10 will receive voice as well as any other audio signals within range of the microphone 10, including background and other noise inputs. The audio signal from microphone 10 is coupled to an amplifier/filter 14 which includes gain stage 32 and amplifier/filter stage 34, respectively, as shown in FIG. 2B. The first stage 32 is a gain/buffer amplifier which, in the present example, has a gain of two and drives a VOX gain control potentiometer depicted as part of the stage 32.

The audio signal from the microphone 10 is then coupled from the gain stage 32 to a high gain stage (voltage gain of approximately 30) that is constructed to have specific frequency dependent characteristics. More specifically, the high gain stage 34 includes a filter pole at 1200 Hz that serves to peak the gain at that frequency and makes the circuit more sensitive at or near that area of the audio band. In addition, the amplifier in stage 34 has another filter pole at approximately 250 kHz that rolls off the response on the high end of the audio signal from microphone 10. The output from stage 34 then drives the comparator stage depicted at 36 which includes an operational amplifier having inverting and non-inverting inputs and an output. The non-inverting input of comparator stage 36 receives the amplified signal from stage 34, while the output of stage 36 provides a voice trigger signal which is readable by and subject to the analysis performed by the programming of Appendix A, as will be described in greater detail below. The voice trigger signal (VT) is provided on a pin through the input/output circuitry 20 which in turn makes that signal available for reading and processing by the computer 24.

The anti-VOX signal at terminal 12 is derived from the audio signal received from an external transmitter that would normally be provided to the earphone or headset of an operator. This same anti-VOX signal could just as well be provided from a speaker or other sound transducer providing the received audio. The signal at 12 is coupled through anti-VOX/amplifier circuit 16 which includes amplifying stage 38 as depicted in FIG. 2B and thence to the inverting input of comparator stage 36. The circuit 16 includes an anti-VOX gain control represented as a potentiometer and an amplifier which is constructed to have the same frequency response as the amplifier/filter stage 34 as was described above. The anti-VOX circuit including input 12 and stage 38 acts to raise the trigger reference for voice keying during receipt of a transmission from an external source. This makes it harder to key the system into a transmit mode during receipt of an incoming audio transmission. However, the anti-VOX signal is removed once the VOX control system keys the transmitter in order to prevent the anti-VOX signal from making it difficult to maintain the system in a keyed condition. This is accomplished by coupling the system key signal at terminal 28 as input to a transistor 40 such that transistor 40 acts to ground the outputs of the amplifying stage 38 during the presence of a system key signal.

The output from the comparator stage 36 is coupled as the voice trigger signal (VT) to the input/output circuitry 20 as shown in FIG. 2A. This VT signal (and other data transfer to computer 24) is then coupled to the computer 24 through the terminal represented as PB0 for analysis in accordance with the programming set forth in Appendix A. The input/output circuitry 20 also includes a resistor-capacitor (RC) delay circuit which is utilized in connection with the system programming to determine the delay between the termination of the voice signal and unkeying of the system. Specifically, the circuit 42 includes an RC agreement wherein the resistance is an operatoradjustable potentiometer that allows the RC time constant to be varied. The output of the circuit 42 is coupled as an input through the I/O circuit 20 to the processor 24 as a VOX delay and is utilized to give the programming the capability to generate a delay factor representing the operator desired delay between voice termination and unkeying of the system.

The system also includes the CVSD and control circuitry 22, which are generally shown by the remainder of the elements and their interconnection as depicted in FIGS. 2A and 2B. The specific circuitry depicted therein is primarily a coder/decoder and timing circuitry that digitizes the audio signal and allows the processor 24 to read the digitized audio as eight bit quantities. The coder/decoder also outputs an audio signal when its transmitter port is written with digitized audio data. Thus, under the control of the computer 24, audio data is received and digitized from the microphone 10 over line 15 and stored through the input/output circuitry 20 in the computer 24. Subsequently, when the computer 24 detects the presence of an audio signal on the voice trigger line VT, it provides the received coded voice to the transmitter port represented by output terminal 26 in FIGS. 1 and 2A. In this manner, the system is capable of storing and delaying any voice information provided at microphone 10 for a time sufficient to allow the VOX control to determine if the system should be keyed. Thus, no audio information is lost between the time that voice audio is initially provided to microphone 10 and the time that the VOX control determines that a system key should be provided.

The primary control of the system is exercised by the computer 24 in connection with specific programming designed to control data flow, issue system keys, provide voice/audio data output, and correlate any other system functions with the operation of the transceiver. The computer 24 can be used in a conventional manner to control the operation of known transceivers to operate in accordance with a pre-programmed procedure. The specific implementation exemplified by the programming of Appendix A, as well as any other programming within the scope of the inventive teachings, can be incorporated and performed in accordance with the normal operating control exercised by the transmission system. Thus, the transmission system program as well as the specific VOX operating control program perform many functions consistent with the particular application. System interrupt may be correlated through the clock input in FIG. 2A in a conventional fashion.

Figure 3A:
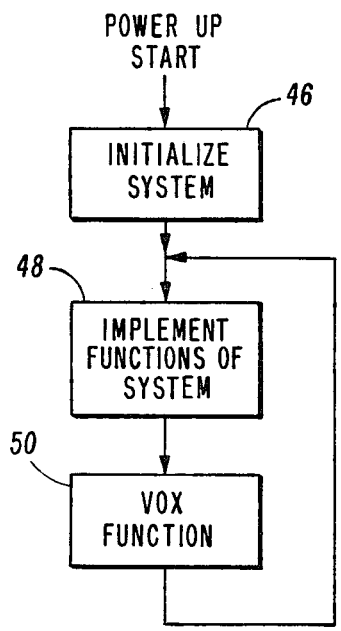
FIGS. 3A and 3B are block flow diagrams showing the broad control functions exercised by the software control programs analyzing the voice signal in the system of FIG. 1.

In connection with the specific programs illustrated in Appendix A and pursuant to the inventive technique, the voice trigger line is monitored by the computer through the input of the input/output circuitry 20. The monitoring is accomplished with the programming in accordance with the general control loop configuration and control flow diagram of FIG. 3A. Specifically, the flow diagram represents the broad functional system programming and includes the detection of power-up at block 46 to initialize the system. Such system initialization can be accomplished in accordance with conventional programming techniques to initialize various values, read in data, check various test points, and perform a variety of other functions necessary for the system to begin proper operation.

Thereafter, the programming flows to block 48 which implements the function of the system itself. This programming may be of any conventional type configured to operate the particular transmission system in a specific manner. By way of example, if the transmission system is a frequency hopping radio, the programming will operate to determine the frequency hopping scheme and generate the necessary timing sequences which allow the radio to communicate with other synchronized radios. The program will then transfer control to the specific VOX programming at block 50 which performs the specific routines and subroutines set forth in Appendix A, and as will be described in greater detail below. The VOX programming then transfers control and flows back to the system functions programming in block 48 to complete the control loop.

Figure 3B:
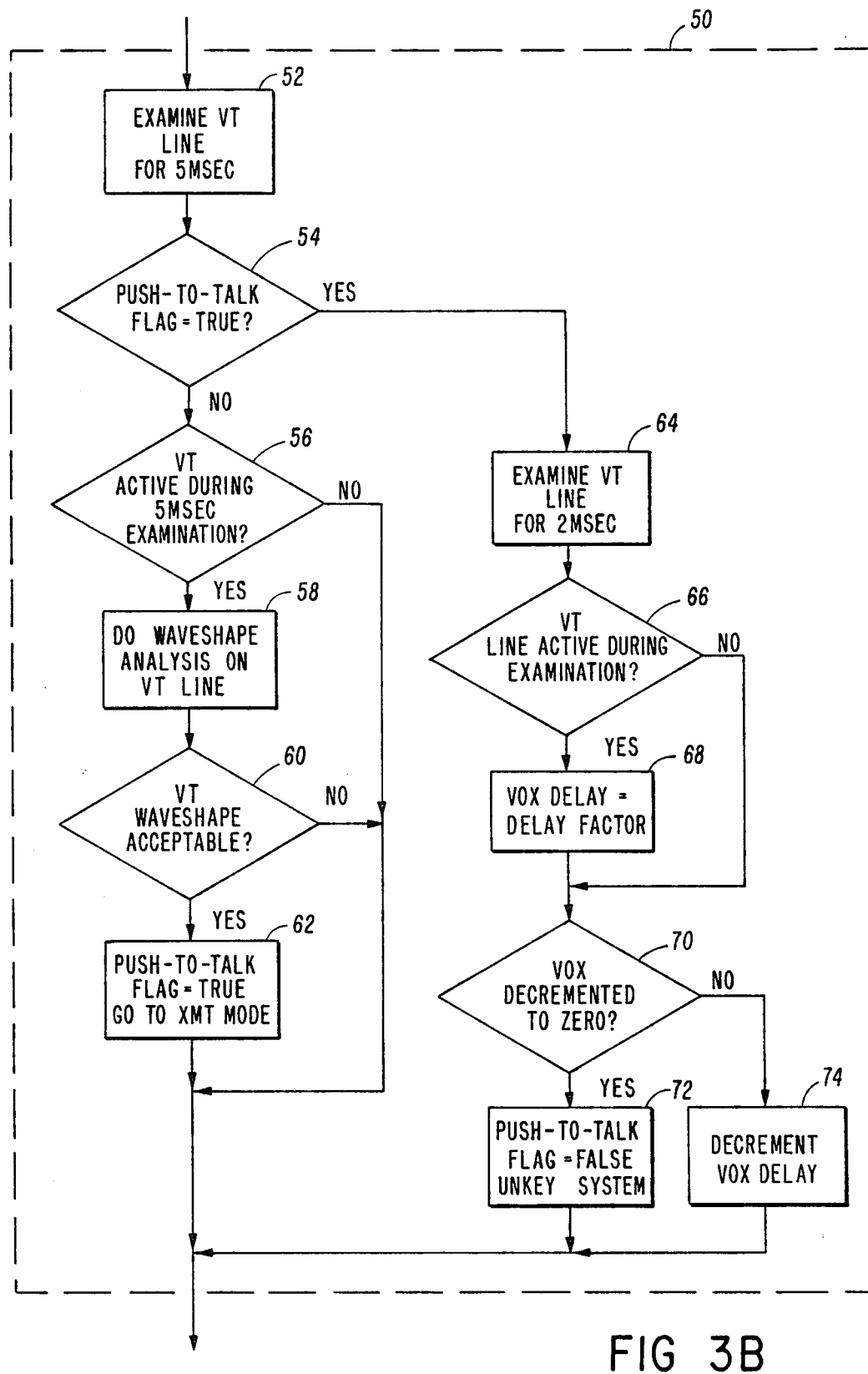

The functions of block 48 and 50 are typically designated as the main loop programming and are entered in the manner described after power-up initialization. The main loop then executes the entire time that the equipment is powered-up in a conventional cyclical fashion. The time required to execute one pass through the block 48 varies in accordance with the functions and system interrupts which must be processed during operation of the loop, but may typically have a value between 350 microseconds to 7 milliseconds. Similarly, the VOX control functions are implemented by the programming of Appendix A as depicted in block 50 of FIG. 3A. These functions are more specifically shown in connection with the more detailed flow diagram of FIG. 3B, to which reference will be made in connection with a more detailed description of the software operation.

The VOX control portion 50 of the main control loop can perform a variety of functions. By way of example, the program monitors the voice trigger line VT and allows its testing to determine the presence of a voice signal. The voice trigger line can be tested once on each pass through the control loop, or it can be examined for a period of time on each pass, depending on the requirements of the system. Upon the detection of voice activity on the voice trigger line, the program execution can be routed to a signal processing routine which then determines whether the audio signal at the microphone 10 is an acceptable voice signal, sufficient to initiate or maintain keying of the system, or whether the audio signal is undesirable and the system key should be suppressed or terminated.

Referring again to FIG. 3B, the VOX programming of block 50 is configured to examine the VT line for a period of 5 milliseconds at block 52. The program then flows to block 54 where a programming check is made to determine if the system is keyed or unkeyed. If a push-to-talk flag is true, the system is keyed, and if the push-to-talk flag is false, the system is unkeyed. If the system is initially unkeyed, or if the flag subsequently goes false following unkeying of the system during operation, the programming flows from block 54 to block 56.

At this point, the VT line is monitored to determine if it is active for 5 milliseconds. If the VT line indicates no voice activity for 5 milliseconds, the system returns to the main control loop to initiate another pass through system programming at block 48. Alternatively, if during the examination at block 56, the programming detects voice activity on the voice trigger line VT, the programming flows to block 58 to perform a waveshape analysis on the voice trigger line. In this regard, the signal processing routine at block 58 can be anything that meets the need of the particular application.

For recognizing voice signals in the context of a telephone adapter as described in connection with the present embodiment, the technique could be that as set forth in the programming of Appendix A. This programming checks the voice trigger line for a high level which indicates an audio signal that is swinging positive above a predetermined threshold. The program includes a series of four timing loops that use loop counters which can be adjusted to tailor the response of the voice-operated control. By way of example, the first loop checks to make sure that the voice trigger line stays high for a predetermined amount of time. The next loop checks to make sure that the voice trigger line goes within a certain interval. The third loop checks to make sure that the voice trigger line stays low for another predetermined amount of time, and the fourth loop ensures that the voice trigger line goes high within a certain window. All of the times necessary for the analysis of each of these loops can be adjusted to alter the frequency and duty cycle requirements of any incoming audio energy. In addition, the four test loops can be adapted to check for only one cycle of the incoming audio energy or can be combined to operate tests over many cycles to reduce the possibility of keying on an undesirable signal. Likewise, if certain noise patterns are known to exist in the environment in which the equipment is to be used, the program (as exemplified by the four test loop analysis) can be written to deliberately reject that noise. The software can thus be adjusted to tighten or lessen the restrictions required to trigger the system on a voice signal.

If, in accordance with the above criteria, the waveshape analysis at block 60 indicates that the signal on the voice trigger line is not acceptable, the programming flows to return the loop to block 48. If, however, the analysis determines that the signal on the voice trigger line meets the pre-programmed criteria and thus represents an acceptable voice signal, the program flows to block 62 which sets the push-to-talk flag equal to true and causes the system to issue a system key signal at terminal 28 and provide delayed digitized audio/voice data at terminal 26. The keyed transceiver then transmits the digitized voice from terminal 26 to provide any voice data from microphone 10 through the CVSD and control circuitry 22, under the control of computer 24 through the I/O circuit 20.

Referring again to FIG. 3B, if the push-to-talk flag in block 54 is found to be true, indicating that the system is keyed, the programming flows to block 64 where the voice trigger line is examined for 2 milliseconds. The programming then flows to block 66 which makes a determination of the activity on the voice trigger line during the 2 millisecond examination. If voice activity is not present on that line during the examination in block 66, the program control flows to block 70. If, however, voice activity is found on the voice trigger line during an examination at 66, program control flows to block 68 where the VOX delay is set equal to a predetermined delay factor, as will be described in more detail below. The programming flow then resumes at block 70 where a determination is made as to whether the VOX delay has been decremented to zero. If the VOX delay has not been decremented to zero, then the VOX delay counter is decremented by one at block 74, and the programming flows control back to the system programming at block 48. If the VOX delay has been decremented to zero, the push-to-talk flag is set to be false at block 72 and the system is unkeyed as represented by the suppression of a keying signal at the output terminal 28. Programming control then flows from block 72 to the system programming in block 48 to complete the programming loop and initiate another pass through the control loop.

With respect to the delay and decrementing portions represented by blocks 68 and 70 of the control loop 50, the same is derived in connection with the RC delay stage 42 described earlier. Specifically, a delay factor is derived by the computer 24 automatically from the RC delay circuit. During inactive intervals when the transceiver is not transmitting, the programming causes testing of the RC delay circuit in order to update the delay factor, which is represented by the RC time constant of the circuit. This test consists of programming the input port to the delay circuit to couple it to an output and driving the output low to discharge the timing capacitor. Thereafter, the computer 24 reprograms the port to the input mode to allow program examination of the RC circuit and times the interval required for the capacitor to charge. The time required for that charge is mathematically manipulated to derive the delay factor. An operator can thus control the value of the delay factor by altering the resistance of the RC circuit in the stage 42. However, the width of the delay range that the operator can control with the delay potentiometer and the minimum/maximum delays possible, can all be controlled by the software and thus do not have to be only a function of the actual time constant of the RC network. The time constant must only be long enough, and the timing loop short enough, to achieve any required resolution for the system.

In implementing the delay for determining unkeying of a system following termination of a voice signal, the delay factor is continuously calculated and used in blocks 68 and 70 to determine when the system is to be unkeyed. Specifically, while there is voice activity on the voice trigger line, the total delay may be represented in a counter wherein the counter is incremented to equal the delay factor during each cycle through that portion of the loop including block 68. Thereafter, that counter is decremented at a predetermined rate at 74 until it reaches zero, representing a lack of activity on the voice trigger line for the predetermined time period desired for unkeying the system. If activity is sensed each time the programming cycles through block 66, the VOX delay is reset to the delay factor and the system remains keyed. However, if voice activity detected at 66 ceases, the decremented counter will reach zero as determined at 70, thereby resulting in the push-to-talk flag being set false and the system being unkeyed.

In accordance with the above operation, any audio/voice provided to the microphone 10 is delayed to enable the analysis of the voice trigger line in accordance with block 58. Thus, the output from microphone 10 through the coder/decoder is stored for a predetermined time in order to make the determination of whether the signal at the microphone is an acceptable voice signal. If the signal is voice, the digitized audio received by the computer 24 is provided to terminal 26 along with the key signal at terminal 28 to allow transmission of the audio data without loss of information. If the signal is not acceptable voice, there is no transmission of the digitized audio since the key signal at terminal 28 is not provided following waveshape analysis.

In connection with the specific circuitry depicted in FIGS. 2A and 2B and the programming set forth in Appendix A, the coder/decoder is read and written during an interrupt service routine of the programming. This interrupt occurs every 125 microseconds (8000 Hz) with a coder bit rate of 64 kHz so that the 8000 Hz interrupt rate gives the coder time to accumulate eight bits of data before it is read. The programming then stores the voice/audio data in a circular buffer in the memory of the computer 24. By way of example, the place in the buffer that the data is stored is controlled by a front pointer which rotates around the circular buffer as each byte of voice/audio data is continuously stored as the coder digitizes audio. From this position, the program calculates back in the audio data one byte for each 125 microseconds of delay that is desired between the termination of voice activity and unkeying of the system. If one/fourth second of voice delay is desired, a back-pointer is set 2000 bytes behind the front pointer. Voice/audio data in memory where the back-pointer is referencing is then written to the coder and that audio is transmitted by the transceiver. The front and back-pointers continue circulating around the buffer the same distance apart for the duration of a voice message.

Thereafter, when an operator stops talking and the system unkeys, the front pointer stops moving. The voice stream continues until the back pointer reaches the front pointer, indicating that everything the operator has spoken has been transmitted. As soon as the back-pointer reaches the front-pointer, the back-pointer is stopped and the front-pointer starts moving again, storing voice data for the next key. The length of the delay can be set to any desired value under program control in accordance with that technique previously described and is only limited by available memory.

As will be appreciated from the above description, the present VOX control circuit enables a more versatile system to be designed which can be configured to meet the functional requirements of the particular environment in which the transmission system is to be employed. This is the result of the many adjustments that may be made to the system, including the amplifier gain, comparator threshold, signal processing parameters of the employed software, number of signal cycles, timer values, delay circuit component values, delay factor equations, and the anti-VOX peak detector. Each of these are variables which can be manipulated to give maximum performance in any given environment.

As a result of the above variables, and particularly the programmed control for analysis of the waveshape and time duration before system unkeying, a system can be constructed that will not key nearly as often on undesirable signals and will not hold keying an unreasonable time. The programming can be constructed to provide high immunity to the kinds of noise that may be generated by handling a telephone handset in the present invention, or the microphone or speaker in the environment of other radio configurations. The system can thus be tailored to eliminate almost all false keys during normal use and yet trigger very reliably on single or multiple voices. Because of the programmable nature of the signal analysis, the configuration of the system can be changed with only minor changes to the programming and the variables defined by that programming. The system can thus be easily configured to recognize only certain signals and to reject other signals as determined by the hardware and software of the control. Furthermore, by correlating the voice signal delay with the system keying, and programmably controlling that delay, loss of information can be prevented while providing adaptability for dynamic operation of the system. All of these are features which are not shown or suggested by any of the prior art.

Obviously, many other modifications and variations are possible in light of the above teachings. It is therefore to be understood that within the scope of the appended claims, the invention may be practiced otherwise than as specifically described.

```
PEACE Q EXECUTIVE 1 0000                TITLE         'PEACE Q EXECUTIVE                      83CR151
 2          ;************************************************************Eicher*****
 3          ;*                                                                          *
 4          ;*    NAME: PEACE QUIET WITH VOX                       PPS REF: 1.2.1       *
 5          ;*                                                                          *
 6          ;*    FILENAME: PEACVX.SRC                                                  *
 7          ;*                                                                          *
 8          ;*    FUNCTION: THIS ROUTINE IS THE EXECUTIVE PROGRAM FROM WHICH THE OTHER  *
 9          ;*              ROUTINES WORK OUT OF TO IMPLEMENT THE CONTROL FUNCTION IN   *
10          ;*              TELEPHONE ADAPTER. IT CONTAINS THE POWER UP INITIALIZATION  *
11          ;*              CODE, THE INTERRUPT VECTOR AREA IN MEMORY, AND THE MAIN     *
12          ;*              LOOP OF THE PROGRAM.                                        *
13          ;*                                                                          *
14          ;*    METHOD:                                                               *
15          ;*                                                                          *
16          ;*    INPUT PARAMETERS:                                                     *
17          ;*      NAME    DESCRIPTION                    TYPE    LENGTH    RANGE      *
18          ;*                                                                          *
19          ;*      NONE                                                                *
20          ;*                                                                          *
21          ;*    OUTPUT PARAMETERS:                                                    *
22          ;*      NAME    DESCRIPTION                    TYPE    LENGTH    RANGE      *
23          ;*                                                                          *
24          ;*      NONE                                                                *
25          ;*                                                                          *
26          ;*    DATA ACCESSED OR ALTERED EXTERNAL TO MODULE:                          *
27          ;*      NAME    DESCRIPTION                    TYPE    LENGTH    RANGE    DIRECTION *
28          ;*                                                                          *
29          ;       CODFLG  CODEC CONTROL FLAGS            RECORD  3 BITS    N/A      BOTH
30          ;*      VOICEB  VOICE BUFFER POINTERS          INTEGER 16 BITS   0-65536  BOTH      *
31          ;*      STCK    PROCESSOR STACK POINTER        INTEGER 16 BITS   0-65536  OUTPUT    *
32          ;*      CNTLDT  CONTROL DATA FOR VP-120        RECORD  3 BYTES   N/A      BOTH      *
33          ;*      DISPLY  DISPLAY DATA FROM VP120        RECORD  2 BYTES   N/A      INPUT     *
34          ;*      BITNUM  BIT POSITION IN MESSAGE        INTEGER 3 BITS    0-7      OUTPUT    *
35          ;*      CNTLBF  BUFFER SWITCH DATA             RECORD  8 BITS    N/A      BOTH      *
36          ;*      CHGFLG  SWITCH CHANGE FLAG             BOOLEAN 1 BIT     N/A      BOTH      *
37          ;*      TIMER   CODEC INT DRIVEN TIMER         INTEGER 2 BYTES   0-65536  INPUT     *
38          ;*      SXTIME  SWITCH BOUNCE TIMER            INTEGER 2 BYTES   0-65536  BOTH      *
39          ;*      SECUR2  SECURE 2 SWITCH LINE           BOOLEAN 1 BIT     N/A      INPUT     *
40          ;*      KEYSEL  KEY CODE SELECT SWITCH         INTEGER 3 BITS    0-7      INPUT     *
41          ;*      FILLIN  FILL INIT SWITCH LINE          BOOLEAN 1 BIT     N/A      INPUT     *
```

```
42          ;*   PUBLIN  PUBLIC KEY INIT SWITCH   BOOLEAN 1 BIT    N/A      INPUT    *
43          ;*   FINTLH  FILL INIT LATCH FLAG     BOOLEAN 1 BIT    N/A      BOTH     *
44          ;*   PUBINL  PUBLIC KEY INIT LATCH    BOOLEAN 1 BIT    N/A      BOTH     *
45          ;*   PLNCFR  PLAIN/CIPHER SWITCH      BOOLEAN 1 BIT    N/A      INPUT    *
46          ;*   PUBLIC  PUBLIC KEY MODE LINE     BOOLEAN 1 BIT    N/A      INPUT    *
47          ;*   PUBMOD  PUBLIC KEY MODE FLAG     BOOLEAN 1 BIT    N/A      BOTH     *
48          ;*   CLKFLT  CLOCK FAULT TIMER        INTEGER 8 BITS   0-255    BOTH     *
49          ;*   FPWRFG  FILL POWER FLAG          BOOLEAN 1 BIT    N/A      BOTH     *
50          ;*   ALARMF  ALARM CONTROL FLAG       BOOLEAN 1 BIT    N/A      BOTH     *
51          ;*   TSTACK  TEST ACKNOWLEDGE FLAG    BOOLEAN 1 BIT    N/A      BOTH     *
52          ;*   TSTRLY  TEST RELAY CONTROL LINE  BOOLEAN 1 BIT    N/A      OUTPUT   *
53          ;*   PTTFLG  PUSH-TO-TALK FLAG        BOOLEAN 1 BIT    N/A      BOTH     *
54          ;*   VOXDYL  VOX DELAY CAP LINE       BOOLEAN 1 BIT    N/A      BOTH     *
55          ;*   VOXTGL  VOX TRIGGER LINE         BOOLEAN 1 BIT    N/A      INPUT    *
56          ;*   VOXTRG  VOX TRIGGER FLAG         BOOLEAN 1 BIT    N/A      BOTH     *
57          ;*   FACTOR  VOX DELAY FACTOR         INTEGER 16 BITS  0-65536  BOTH     *
58          ;*   SIDETN  SIDETONE RELAY CNT LINE  BOOLEAN 1 BIT    N/A      OUTPUT   *
59          ;*   XMTTIM  XMT VOICE DELAY TIMER    INTEGER 16 BITS  0-65536  BOTH     *
60          ;*   VOXDLY  VOX DELAY TO RCV TIMER   INTEGER 16 BITS  0-65536  BOTH     *
61          ;*                                                                       *
62          ;*   RESTRICTIONS:                                                       *
63          ;*                                                                       *
64          ;*   SUPPORTING MODULES: CODECI - SERVICE CODEC INTERRUPT                *
65          ;*                       CLOCKI - SERVICE CLOCK INTERRUPT                *
66          ;*                       SWITCH - SERVICE THE PANEL SWITCHES             *
67          ;*                                                                       *
68          ;*   COPYRIGHT 1983  ROCKWELL INTERNATIONAL                              *
69          ;*   COLLINS TELECOMMUNICATIONS PRODUCTS DIVISION                        *
70          ;*                                                                       *
71          ;*   AUTHOR: D.E. EICHER                  DATE: 11/11/83                 *
72          ;*                                                                       *
73          ;*   VERSION: 1.0                                                        *
74          ;*                                                                       *
75          ;*   REVISIONS:                           DATE:                          *
76          ;*                                                                       *
77          ;****************************************************************
78 0000
79                   CSEG
80                   NAME      PEACEQ
81 0000
82                   PUBLIC    PEACEQ
83 0000
84                   EXTRN     CLOCKI,CODECI,CODFLG,VOICEB,ADDRA,CODECC,APRTBC
85                   EXTRN     APRTB,INTMSK,APRTA,FRONTB,BACKBF,STCK,APRTBS
86                   EXTRN     CNTLDT,DISPLY,CNTLRF,TIMER,SWTIME,SYSSTS,RITNUM
87                   EXTRN     STARTO,TOLOW,TOHIGH,TOCMD,T1CMD,T1LOW,T1HIGH
88                   EXTRN     VXTIME,APRTCC,APRTCS,APRTAC,APRTAS,FACTOR
89                   EXTRN     VOXDLY,XMTTIM,ENDBUF,CLKFLT,SWITCH,HOKTIM
90 0000
91          ;* PROCEDURE PEACEQ
92 0000
93 0000     PEACEQ:
94 0000
95          ;* % LOAD STACK POINTER
96 0000
97 0000 31 00 00    E     LD    SP,STCK
98 0003 18 63 0068        JR    BEGIN
99 0005
```

```
100                       ;* * INTERRUPT VECTOR USED
101 0005
102 0005                        DS      27H
103 002C C3 00 00   E           JP      CLOCKI          ;RSTC
104 002F
105                       ;* * CODEC TRANSMIT/RECEIVE INTERRUPT
106 002F
107 002F                        DS      5
108 0034 C3 00 00   F           JP      CODECI          ;RSTB
109 0037
110                       ;* * INTERRUPT FOR ON/OFF HOOK TEST
111 0037
112 0037                        DS      1
113 0038 E1                     POP     HL              ;INTR
114 0039 C9                     RET
115 003A
116                       ;* * INTERRUPT VECTOR FOR RSTA UNUSED
117 003A
118 003A                        DS      1
119 003B C3 00 00   C           JP      PEACEQ          ;RSTA
120 003E
121                       ;* * NON-MASKABLE INTERRUPT UNUSED
122 003E
123 003E                        DS      27H
124 0065 C3 00 00   C           JP      PEACEQ          ;NMI
125 0068
126                       ;* * EXECUTIVE PROGRAM FOR PEACE QUIET
127 0068
128 0068                  BEGIN:
129 0068
130                       ;* * SET INTERRUPT MODE 1 FOR ON/OFF HOOK
131 0068
132 0068 ED 56                  IM      1
133 006A
134                       ;* * LOAD SYSTEM FLAG POINTER = CODEC FLAGS
135 006A
136 006A DD 21 00 00 E          LD      IX,CODFLG
137 006E
138                       ;* * INITIALIZE NSC810 PORT DATA
139 006E
140 006E 3E 00                  LD      A,00H
141 0070 D3 00      E           OUT     (.LOW.APRTA),A
142 0072 3E 20                  LD      A,20H
143 0074 D3 01      E           OUT     (.LOW.APRTA+1),A
144 0076 3E 00                  LD      A,00H
145 0078 D3 02      E           OUT     (.LOW.APRTA+2),A
146 007A
147                       ;* * INITIALIZE NSC810 DATA DIRECTION REGS A, B, C
148 007A
149 007A 3E 80                  LD      A,80H
150 007C D3 00      E           OUT     (.LOW.ADDRA),A
151 007E 3E E5                  LD      A,0E5H
152 0080 D3 01      E           OUT     (.LOW.ADDRA+1),A
153 0082 3E 3E                  LD      A,3EH
154 0084 D3 02      E           OUT     (.LOW.ADDRA+2),A
155 0086
156                       ;* * INITIALIZE T0 TIMER COMMAND
157 0086
158 0086 3E 85                  LD      A,85H
```

```
159 0088 0E 00        E         LD      C,.LOW.TOCMD
160 008A ED 79                  OUT     (C),A
161 008C
162                        ;* * INITIALIZE T1 TIMER COMMAND
163 008C
164 008C 0C                     INC     C
165 008D 3E 07                  LD      A,07H
166 008F ED 79                  OUT     (C),A
167 0091
168                        ;* * INITIALIZE T0 TIMER COUNT VALUE
169 0091
170 0091 3E 50                  LD      A,80
171 0093 D3 00        E         OUT     (.LOW.T0LOW),A
172 0095 AF                     XOR     A
173 0096 D3 00        E         OUT     (.LOW.T0HIGH),A
174 0098
175                        ;* * START TIMER 0
176 0098
177 0098 D3 00        E         OUT     (.LOW.START0),A
178 009A
179                        ;* * INITIALIZE VOICE BUFFER
180 009A
181 009A D9                     EXX
182 009B 11 00 00     E         LD      DE,VOICEB
183 009E 01 02 00     E         LD      BC,VOICEB+2
184 00A1 D9                     EXX
185 00A2
186                        ;* * INITIALIZE FIRST BYTE OF CONTROL DATA
187 00A2
188 00A2 21 00 00     E         LD      HL,CNTLDT
189 00A5 36 08                  LD      (HL),08H
190 00A7
191                        ;* * INITIALIZE BYTE TWO OF CONTROL DATA
192 00A7
193 00A7 23                     INC     HL
194 00A8 36 89                  LD      (HL),89H
195 00AA
196                        ;* * INITIALIZE BYTE THREE OF CONTROL DATA
197 00AA
198 00AA 23                     INC     HL
199 00AB 36 98                  LD      (HL),98H
200 00AD
201                        ;* * INITIALIZE DISPLAY DATA BYTE ONE
202 00AD
203 00AD 21 00 00     E         LD      HL,DISPLY
204 00B0 36 00                  LD      (HL),0
205 00B2
206                        ;* * INITIALIZE BYTE TWO OF DISPLAY DATA
207 00B2
208 00B2 23                     INC     HL
209 00B3 36 27                  LD      (HL),027H
210 00B5
211                        ;* * INITIALIZE BYTE THREE OF DISPLAY DATA
212 00B5
213 00B5 23                     INC     HL
214 00B6 36 80                  LD      (HL),80H
215 00B8
216                        ;* * INITIALIZE MESSAGE BIT NUMBER = 00
217 00B8
218 00B8 AF                     XOR     A
```

```
219 00B9 32 00 00      E          LD     (BITNUM),A
220 00BC
221                          ;* * READ COPY OF PANEL SWITCH
222 00BC
223 00BC DB 00         E          IN     A,(.LOW.APRTA)
224 00BE 32 00 00      E          LD     (CNTLBF),A
225 00C1
226                          ;* * POINT TO CONTROL DATA
227 00C1
228 00C1 FD 21 00 00   E          LD     IY,CNTLDT
229 00C5
230                          ;* * SYSTEM STATUS = PANEL SWITCH DATA
231 00C5
232 00C5 3A 00 00      E          LD     A,(CNTLBF)
233 00C8 32 00 00      E          LD     (SYSSTS),A
234 00CB
235                          ;* * IF
236                          ;* * FILL INITIATE BUTTON = ACTIVE
237 00CB
238 00CB CB 47                    BIT    0,A
239 00CD C2 D4 00      C          JP     NZ,CHKMOD
240 00D0
241                          ;* * THEN
242                          ;* * * FILL MODE FLAG = TRUE
243 00D0
244 00D0 DD CB 01 C6             SET    0,(IX+1)
245 00D4
246                          ;* * END IF
247 00D4
248 00D4                     CHKMOD:
249 00D4
250                          ;* * VOX DELAY FACTOR = .75 SECONDS
251 00D4
252 00D4 21 70 17                 LD     HL,6000
253 00D7 22 00 00      E          LD     (FACTOR),HL
254 00DA
255                          ;* * FORCE SWITCH CHANGE
256 00DA
257 00DA DB 00         E          IN     A,(.LOW.APRTA)
258 00DC E6 7F                    AND    07FH
259 00DE 3C                       INC    A
260 00DF 32 00 00      E          LD     (CNTLBF),A
261 00E2
262                          ;* * ENABLE CODEC AND CLOCK INTERRUPTS
263 00E2
264 00E2 3E 06                    LD     A,06H
265 00E4 D3 B8                    OUT    (0B8H),A
266 00E6 32 00 00      E          LD     (INTMSK),A
267 00E9 FB                       EI
268 00EA
269                          ;* * INITIALIZE CODEC HARDWARE
270 00EA
271 00EA 3E 03                    LD     A,03H
272 00EC D3 00         E          OUT    (.LOW.CODECC),A
273 00EE
274                          ;* * REMOVE RESET FROM INTERRUPT FLIP-FLOP
275 00EE
276 00EE 3E 0C                    LD     A,0CH
```

```
277 00F0 D3 00         E         OUT     (.LOW.AFRTBS),A
278 00F2
279                              ;* * INITIALIZE CODEC FLAGS, RECEIVE FLAG = TRUE
280 00F2
281 00F2 DD 36 00 02             LD      (IX),02
282 00F6 DD 36 01 00             LD      (IX+1),00
283 00FA
284                              ;* * DO UNTIL DOOMSDAY
285 00FA
286 00FA                MAIN:
287 00FA
288                              ;* * * SERVICE SWITCHES
289 00FA
290 00FA CD 00 00       E         CALL   SWITCH
291 00FD
292                              ;* * * IF
293                              ;* * * * ( FILL INIT LATCH BIT = TRUE )
294 00FD
295 00FD 21 01 00       E         LD     HL,CNTLBT+1
296 0100 DD CB 01 46              BIT    0,(IX+1)
297 0104 CA 19 01       C         JP     Z,NOFILL
298 0107
299                              ;* * * AND
300                              ;* * * * ( SELF TEST MODE = INACTIVE )
301 0107
302 0107 CB 46                    BIT    0,(HL)
303 0109 CA 19 01       C         JP     Z,NOFILL
304 010C
305                              ;* * * AND
306                              ;* * * * ( FILL INIT ENABLE = TRUE )
307 010C
308 010C FD 21 02 00    E         LD     IY,DISPLY+2
309 0110 FD CB 00 66              BIT    4,(IY)
310 0114 28 03 0119               JR     Z,NOFILL
311 0116
312                              ;* * * THEN
313                              ;* * * * FILL MODE = ACTIVE
314 0116
315 0116 2B                       DEC    HL
316 0117 CB 86                    RES    0,(HL)
317 0119
318                              ;* * * END IF
319 0119
320 0119                NOFILL:
321 0119
322                              ;* * * IF
323                              ;* * * * CLOCK FAULT TIMER > 00
324 0119
325 0119 21 00 00       E         LD     HL,CLKFLT
326 011C 7E                       LD     A,(HL)
327 011D B7                       OR     A
328 011E 28 01 0121               JR     Z,FLTZER
329 0120
330                              ;* * * THEN
331                              ;* * * * CLOCK FAULT TIMER = CLOCK FAULT TIMER - 1
332 0120
333 0120 35                       DEC    (HL)
334 0121
335                              ;* * * END IF
```

```
336 0121
337 0121                   FLTZER:
338 0121
339                                ;* * * IF
340                                ;* * * * ( CLOCK FAULT TIMER = 00 )
341 0121
342 0121 CA 2C 01      C           JP     Z,ALMON
343 0124
344                                ;* * * OR
345                                ;* * * * ( ALARM DISPLAY FLAG = TRUE )
346 0124
347 0124 21 01 00      E           LD     HL,DISPLY+1
348 0127 CB 46                     BIT    0,(HL)
349 0129 C2 30 01      C           JP     NZ,NALARM
350 012C
351                                ;* * * THEN
352 012C
353 012C                   ALMON:
354 012C
355                                ;* * * * ALARM CONTROL FLAG = TRUE
356 012C
357 012C DD CB 01 E6               SET    4,(IX+1)
358 0130
359                                ;* * * END IF
360 0130
361 0130                   NALARM:
362 0130
363                                ;* * * IF
364                                ;* * * * ( FILL POWER FLAG = TRUE )
365 0130
366 0130 21 00 00      E           LD     HL,CNTLBT
367 0133 FD 21 01 00   E           LD     IY,DISPLY+1
368 0137 DD CB 01 6E               BIT    5,(IX+1)
369 013B CA 56 01      C           JP     Z,NTFILL
370 013E
371                                ;* * * AND
372                                ;* * * * ( FILL POWER CONTROL BIT = OFF )
373 013E
374 013E FD CB 00 5E               BIT    3,(IY)
375 0142 C2 56 01      C           JP     NZ,NTFILL
376 0145
377                                ;* * * AND
378                                ;* * * * ( DISPLY ALARM FLAG = INACTIVE )
379 0145
380 0145 FD CB 00 46               BIT    0,(IY)
381 0149 CA 56 01      C           JP     Z,NTFILL
382 014C
383                                ;* * * THEN
384                                ;* * * * FILL MODE = FALSE
385 014C
386 014C CB C6                     SET    0,(HL)
387 014E
388                                ;* * * * FILL INIT LATCH FLAG = FALSE
389 014E
390 014E DD CB 01 86               RES    0,(IX+1)
391 0152
392                                ;* * * * FILL POWER FLAG = FALSE
393 0152
394 0152 DD CB 01 AE               RES    5,(IX+1)
```

```
395 0156
396                    ;* * * END IF
397 0156
398 0156               NTFILL:
399 0156
400                    ;* * * IF
401                    ;* * * * ( TEST ACKNOWLEDGE FLAG = TRUE )
402 0156
403 0156 23                       INC     HL
404 0157 DD CB 01 76              BIT     6,(IX+1)
405 015B CA 72 01    C            JP      Z,NOTEST
406 015E
407                    ;* * * AND
408                    ;* * * * ( ALARM CONDITION = FALSE )
409 015E
410 015E DD CB 01 66              BIT     4,(IX+1)
411 0162 C2 72 01     C            JP      NZ,NOTEST
412 0165
413                    ;* * * AND
414                    ;* * * * ( DISPLAY TEST BIT = FALSE )
415 0165
416 0165 FD CB 00 76              BIT     6,(IY)
417 0169 C2 72 01     C            JP      NZ,NOTEST
418 016C
419                    ;* * * THEN
420                    ;* * * * TEST MODE = FALSE
421 016C
422 016C CB C6                    SET     0,(HL)
423 016E
424                    ;* * * * TEST ACKNOWLEDGE FLAG = FALSE
425 016E
426 016E DD CB 01 B6              RES     6,(IX+1)
427 0172
428                    ;* * * END IF
429 0172
430 0172               NOTEST:
431 0172
432                    ;* * * IF
433                    ;* * * * DISPLAY TEST ACKNOWLEDGE FLAG = TRUE
434 0172
435 0172 FD CB 00 76              BIT     6,(IY)
436 0176 CA 7D 01     C            JP      Z,NOTACK
437 0179
438                    ;* * * THEN
439                    ;* * * * TEST ACKNOWLEDGE FLAG = TRUE
440 0179
441 0179 DD CB 01 F6              SET     6,(IX+1)
442 017D
443                    ;* * * END IF
444 017D
445 017D               NOTACK:
446 017D
447                    ;* * * IF
448                    ;* * * * DISPLAY TEST BIT = TRUE
449 017D
450 017D 3E 02                    LD      A,02H
451 017F FD CB 00 76              BIT     6,(IY)
452 0183 CA 8B 01     C            JP      Z,RELAY0
453 0186
```

```
454                     ;* * * THEN
455                     ;* * * * SELF TEST RELAY CONTROL = TRUE
456 0186
457 0186 D3 00       E          OUT     (.LOW.APRTCS),A
458 0188 C3 8D 01    C          JP      NRELAY
459 018B
460                     ;* * * ELSE
461 018B
462 018B                        RELAY0:
463 018B
464                     ;* * * * SELF TEST RELAY CONTROL = FALSE
465 018B
466 018B D3 00       E          OUT     (.LOW.APRTCC),A
467 018D
468                     ;* * * END IF
469 018D
470 018D                        NRELAY:
471 018D
472                     ;* * * IF
473                     ;* * * * ( PUBLIC KEY INIT SWITCH = ACTIVE )
474 018D
475 018D DD CB 01 4E           BIT     1,(IX+1)
476 0191 CA A7 01    C          JP      Z,NOPUBL
477 0194
478                     ;* * * AND
479                     ;* * * * ( PUBLIC KEY INIT ACKNOWLEDGE = INACTIVE )
480 0194
481 0194 FD CB 01 6E           BIT     5,(IY+1)
482 0198 CA A7 01    C          JP      Z,NOPUBL
483 019B
484                     ;* * * AND
485                     ;* * * * ( SELF TEST MODE = INACTIVE )
486 019B
487 019B CB 46                 BIT     0,(HL)
488 019D CA A7 01    C          JP      Z,NOPUBL
489 01A0
490                     ;* * * THEN
491                     ;* * * PUBLIC INIT CONTROL FLAG = TRUE
492 01A0
493 01A0 23                    INC     HL
494 01A1 CB EE                 SET     5,(HL)
495 01A3
496                     ;* * * PTT HOLD OFF FLAG = TRUE
497 01A3
498 01A3 DD CB 00 DE           SET     3,(IX)
499 01A7
500                     ;* * * END IF
501 01A7
502 01A7                        NOPUBL:
503 01A7
504                     ;* * * IF
505                     ;* * * * ( PUBLIC KEY INIT ACKNOWLEDGE BIT = ACTIVE )
506 01A7
507 01A7 21 01 00     E          LD      HL,CNTLDT+1
508 01AA FD CB 01 6E            BIT     5,(IY+1)
509 01AE CA B6 01    C          JP      Z,CPUBLC
510 01B1
511                     ;* * * OR
512                     ;* * * * ( SELF TEST MODE = ACTIVE )
```

```
513 01B1
514 01B1 CB 46                    BIT    0,(HL)
515 01B3 C2 BD 01      C          JP     NZ,NOTCLR
516 01B6
517                        ;* * * THEN
518 01B6
519 01B6                           CPL
520 01B6
521                        ;* * * * PUBLIC KEY INIT LATCH FLAG = FALSE
522 01B6
523 01B6 DD CB 01 8E              RES    1,(IX+1)
524 01BA
525                        ;* * * * PUBLIC INIT CONTROL FLAG = FALSE
526 01BA
527 01BA 23                        INC    HL
528 01BB CB AE                    RES    5,(HL)
529 01BD
530                        ;* * * END IF
531 01BD
532 01BD                   NOTCLR:
533 01BD
534                        ;* * * IF
535                        ;* * * * FRONT VOICE BUFFER POINTER = BACK POINTER
536 01BD
537 01BD F3                        DI
538 01BE D9                        EXX
539 01BF B7                        OR     A
540 01C0 62                        LD     H,D
541 01C1 6B                        LD     L,E
542 01C2 ED 42                     SBC    HL,BC
543 01C4 D9                        EXX
544 01C5 FB                        EI
545 01C6 C2 D1 01      C           JP     NZ,LOKPTT
546 01C9
547                        ;* * * THEN
548                        ;* * * * CODEC TRANSMIT FLAG = FALSE
549 01C9
550 01C9 DD CB 00 86              RES    0,(IX)
551 01CD
552                        ;* * * * CODEC RECEIVE FLAG = TRUE
553 01CD
554 01CD DD CB 00 CE              SET    1,(IX)
555 01D1
556                        ;* * * END IF
557 01D1
558 01D1                   LOKPTT:
559 01D1
560                        ;* * * IF
561                        ;* * * * PUSH-TO-TALK = FALSE
562 01D1
563 01D1 DD CB 01 5E              BIT    3,(IX+1)
564 01D5 C2 39 02      C          JP     NZ,CHKIND
565 01D8
566                        ;* * * AND
567                        ;* * * * ( TIMER = ONE SECOND BOUNDRY )
568 01D8
569 01D8 3A 00 00      E           LD     A,(TIMER)
570 01DB E6 FE                     AND    0FEH
```

```
571 01DD C2 39 02    C           JP      NZ,CHKIND
572 01E0 3A 01 00    E           LD      A,(TIMER+1)
573 01E3 E6 1F                   AND     01FH
574 01E5 C2 39 02    C           JP      NZ,CHKIND
575 01E8
576                          ;* * * THEN
577                          ;* * * * INITIALIZE CODEC HARDWARE
578 01E8
579 01E8 3E 03                   LD      A,03H
580 01EA D3 00       E           OUT     (.LOW.CODECC),A
581 01EC
582                          ;* * * * CHARGE TIME = 00
583 01EC
584 01EC 11 00 00                LD      DE,0
585 01EF
586                          ;* * * * WRITE VOX DELAY LINE TO AN OUTPUT
587 01EF
588 01EF 3E ED                   LD      A,0EDH
589 01F1 D3 01       E           OUT     (.LOW.ADDRA+1),A
590 01F3
591                          ;* * * * DISABLE INTERRUPTS FOR ACCURATE TIMING
592 01F3
593 01F3 F3                      DI
594 01F4
595                          ;* * * * WRITE VOX DELAY LINE LOW TO DUMP CAP
596 01F4
597 01F4 3E 08                   LD      A,08H
598 01F6 D3 00       E           OUT     (.LOW.APRTBC),A
599 01F8
600                          ;* * * * WRITE VOX DELAY LINE TO AN INPUT
601 01F8
602 01F8 3E E5                   LD      A,0E5H
603 01FA D3 01       E           OUT     (.LOW.ADDRA+1),A
604 01FC
605                          ;* * * * DO UNTIL VOX DELAY = TRUE
606 01FC
607 01FC            TESTLP:
608 01FC
609                          ;* * * * * CHARGE TIME = CHARGE TIME + 1
610 01FC
611 01FC 13                      INC     DE
612 01FD
613                          ;* * * * END UNTIL
614 01FD
615 01FD DB 00       E           IN      A,(.LOW.APRTB)
616 01FF CB 5F                   BIT     3,A
617 0201 CA FC 01    C           JP      Z,TESTLP
618 0204
619                          ;* * * * ENABLE INTERRUPTS, TIMING OVER
620 0204
621 0204 FB                      EI
622 0205
623                          ;* * * * FACTOR = CHARGE TIMER * 8
624 0205
625 0205 EB                      EX      DE,HL
626 0206 CB 25                   SLA     L
627 0208 CB 14                   RL      H
628 020A CB 25                   SLA     L
629 020C CB 14                   RL      H
```

```
630 020E CB 25                    SLA     L
631 0210 CB 14                    RL      H
632 0212
633                     ;* * * * FACTOR = ( 8 * CHARGE TIMER ) * 10
634 0212
635 0212 E5                       PUSH    HL
636 0213 CB 25                    SLA     L
637 0215 CB 14                    RL      H
638 0217 CB 25                    SLA     L
639 0219 CB 14                    RL      H
640 021B CB 25                    SLA     L
641 021D CB 14                    RL      H
642 021F EB                       EX      DE,HL
643 0220 E1                       POP     HL
644 0221 E5                       PUSH    HL
645 0222 CB 25                    SLA     L
646 0224 CB 14                    RL      H
647 0226 19                       ADD     HL,DE
648 0227
649                     ;* * * * FACTOR = ((8 * CHARGE TIME) * 10 + (8 * CHARGE TIME)) * 2
650 0227
651 0227 EB                       EX      DE,HL
652 0228 E1                       POP     HL
653 0229 19                       ADD     HL,DE
654 022A CB 25                    SLA     L
655 022C CB 14                    RL      H
656 022E
657                     ;* * * * FACTOR = ( 2 * ( 176 * CHARGE TIME )) + 1130
658 022E
659 022E CB 25                    SLA     L
660 0230 CB 14                    RL      H
661 0232 11 6A 04                 LD      DE,1130
662 0235 19                       ADD     HL,DE
663 0236
664                     ;* * * * STORE DELAY FACTOR
665 0236
666 0236 22 00 00     E            LD      (FACTOR),HL
667 0239
668                     ;* * * END IF
669 0239
670 0239                  CHKIND:
671 0239
672                     ;* * * IF
673                     ;* * * * CIPHER DISPLAY DATA = ON
674 0239
675 0239 21 01 00     E            LD      HL,DISPLY+1
676 023C CB 6E                     BIT     5,(HL)
677 023E 3E 08                     LD      A,08H
678 0240 C2 48 02     C            JP      NZ,CLRIND
679 0243
680                     ;* * * THEN
681                     ;* * * * CIPHER INDICATOR LAMP = ON
682 0243
683 0243 D3 00        E            OUT     (.LOW.APRTCS),A
684 0245 C3 4A 02     C            JP      CHKALM
685 0248
686                     ;* * * ELSE
687 0248
688 0248                  CLRIND:
```

```
689 0248
690                          ;* * * CIPHER INDICATOR LAMP = OFF
691 0248
692 0248 D3 00        E              OUT     (.LOW.APRTCC),A
693 024A
694                          ;* * * END IF
695 024A
696 024A                     CHKALM:
697 024A
698                          ;* * * IF
699                          ;* * * * SYSTEM ALARM FLAG BIT = TRUE
700 024A
701 024A DD CB 01 66                BIT     4,(IX+1)
702 024E 3E 20                      LD      A,20H
703 0250 CA 58 02     C              JP      Z,CLRALM
704 0253
705                          ;* * * THEN
706                          ;* * * * ALARM INDICATOR LAMP = ON
707 0253
708 0253 D3 00        E              OUT     (.LOW.APRTCS),A
709 0255 C3 5A 02     C              JP      CHKPUB
710 0258
711                          ;* * * ELSE
712 0258
713 0258                     CLRALM:
714 0258
715                          ;* * * * ALARM INDICATOR = OFF
716 0258
717 0258 D3 00        E              OUT     (.LOW.APRTCC),A
718 025A
719                          ;* * * END IF
720 025A
721 025A                     CHKPUB:
722 025A
723                          ;* * * IF
724                          ;* * * * PUBLIC KEY DISPLAY DATA BIT = TRUE
725 025A
726 025A 23                          INC     HL
727 025B CB 7E                       BIT     7,(HL)
728 025D 3E 04                       LD      A,04H
729 025F C2 67 02     C              JP      NZ,CLRPUB
730 0262
731                          ;* * * THEN
732                          ;* * * * PUBLIC KEY INDICATOR = ON
733 0262
734 0262 D3 00        E              OUT     (.LOW.APRTCS),A
735 0264 C3 73 02     C              JP      CHKFIL
736 0267
737                          ;* * * ELSE
738 0267
739 0267                     CLRPUB:
740 0267
741                          ;* * * * PUBLIC KEY INDICATOR = OFF
742 0267
743 0267 D3 00        E              OUT     (.LOW.APRTCC),A
744 0269
745                          ;* * * * IF
746                          ;* * * * * PUBLIC KEY INIT LATCH FLAG = FALSE
747 0269
```

```
748 0269 DD CB 01 4E               BIT      1,(IX+1)
749 026D 20 04 0273                JR       NZ,CHKFIL
750 026F
751                                ;* * * THEN
752                                ;* * * * PTT HOLD OFF FLAG = FALSE
753 026F
754 026F DD CB 00 9E               RES      3,(IX)
755 0273
756                                ;* * * END IF
757                                ;* * END IF
758 0273
759 0273              CHKFIL:
760 0273
761                                ;* * * IF
762                                ;* * * * FILL POWER ENABLE BIT = TRUE
763 0273
764 0273 2B                        DEC      HL
765 0274 3E 04                     LD       A,04H
766 0276 CB 5E                     BIT      3,(HL)
767 0278 CA 84 02     C            JP       Z,FILOFF
768 027B
769                                ;* * * THEN
770                                ;* * * * FILL POWER FLAG = TRUE
771 027B
772 027B DD CB 01 EE               SET      5,(IX+1)
773 027F
774                                ;* * * * FILL POWER = ON
775 027F
776 027F D3 00       E             OUT      (.LOW.APRTBS),A
777 0281 C3 86 02    C             JP       CHKCLK
778 0284
779                                ;* * * ELSE
780 0284
781 0284             FILOFF:
782 0284
783                                ;* * * * FILL POWER = OFF
784 0284
785 0284 D3 00       E             OUT      (.LOW.APRTBC),A
786 0286
787                                ;* * * END IF
788 0286
789 0286             CHKCLK:
790 0286
791                                ;* * * IF
792                                ;* * * * FILL CLOCK ENABLE BIT = TRUE
793 0286
794 0286 3E 20                     LD       A,20H
795 0288 CB 66                     BIT      4,(HL)
796 028A CA 92 02    C             JP       Z,CLKOFF
797 028D
798                                ;* * * THEN
799                                ;* * * * FILL CLOCK = ON
800 028D
801 028D D3 00       E             OUT      (.LOW.APRTBC),A
802 028F C3 94 02    C             JP       CHKSID
803 0292
804                                ;* * * ELSE
805 0292
```

```
806 0292                        CLKOFF:
807 0292
808                             ;* * * FILL CLOCK = OFF
809 0292
810 0292 D3 00         E                OUT     (.LOW.APRTRS),A
811 0294
812                             ;* * * END IF
813 0294
814 0294                        CHKSID:
815 0294
816                             ;* * * IF
817                             ;* * * * ( ALARM FLAG = FALSE )
818 0294
819 0294 3E 10                          LD      A,10H
820 0296 21 01 00      E                LD      HL,DISPLY+1
821 0299 CB 46                          BIT     0,(HL)
822 029B 28 10 02AD                     JR      Z,CLRSID
823 029D
824                             ;* * * AND
825                             ;* * * * ( PUSH-TO-TALK FLAG = TRUE )
826 029D
827 029D DD CB 01 5E                    BIT     3,(IX+1)
828 02A1 28 0A 02AD                     JR      Z,CLRSID
829 02A3
830                             ;* * * AND
831                             ;* * * * ( SIDETONE FLAG = TRUE )
832 02A3
833 02A3 23                             INC     HL
834 02A4 CB 76                          BIT     6,(HL)
835 02A6 28 05 02AD                     JR      Z,CLRSID
836 02A8
837                             ;* * * THEN
838                             ;* * * * SIDETONE CONTROL LINE = TRUE
839 02A8
840 02A8 D3 00         E                OUT     (.LOW.APRTCS),A
841 02AA C3 AF 02      C                JP      CKHOOK
842 02AD
843                             ;* * * ELSE
844 02AD
845 02AD                        CLRSID:
846 02AD
847                             ;* * * * SIDETONE CONTROL LINE = FALSE
848 02AD
849 02AD D3 00         E                OUT     (.LOW.APRTCC),A
850 02AF
851                             ;* * * END IF
852 02AF
853 02AF                        CKHOOK:
854 02AF
855                             ;* * * LOAD RETURN ADDRESS FOR HOOK CHECK
856 02AF
857 02AF 21 FC 02      C                LD      HL,TESTHK
858 02B2 E5                             PUSH    HL
859 02B3
860                             ;* * * IF
861                             ;* * * * ON/OFF HOOK INTERRUPT LINE = HIGH = OFF HOOK
862 02B3
863 02B3 F3                             DI
```

```
864 02B4 3E 01                    LD     A,1
865 02B6 D3 BB                    OUT    (0BBH),A
866 02B8 FB                       EI
867 02B9 00                       NOP
868 02BA 00                       NOP
869 02BB 00                       NOP
870 02BC
871                        ;* * * THEN
872                        ;* * * * CLEAN UP STACK
873 02BC
874 02BC F3                       DI
875 02BD E1                       POP    HL
876 02BE
877                        ;* * * * IF
878                        ;* * * * * HOOK CONTROL FLAG = FALSE
879 02BE
880 02BE DD CB 00 66              BIT    4,(IX)
881 02C2 20 0E 02D2               JR     NZ,CHKHOK
882 02C4
883                        ;* * * * THEN
884                        ;* * * * * OFF HOOK DELAY TIMER = 500 MILLISECONDS
885 02C4
886 02C4 2A 00 00      E          LD     HL,(TIMER)
887 02C7 11 A0 0F                 LD     DE,4000
888 02CA 19                       ADD    HL,DE
889 02CB 22 00 00      E          LD     (HOKTIM),HL
890 02CE
891                        ;* * * * * HOOK CONTROL FLAG = TRUE
892 02CE
893 02CE DD CB 00 E6              SET    4,(IX)
894 02D2
895                        ;* * * * END IF
896 02D2
897 02D2                  CHKHOK:
898 02D2
899                        ;* * * * IF
900                        ;* * * * * HOOK CONTROL FLAG = TRUE
901 02D2
902 02D2 DD CB 00 66              BIT    4,(IX)
903 02D6 28 40 0318               JR     Z,DISINT
904 02D8
905                        ;* * * * THEN
906                        ;* * * * * IF
907                        ;* * * * * HOOK DELAY TIMER < TIMER
908 02D8
909 02D8 2A 00 00      E          LD     HL,(HOKTIM)
910 02DB 54                       LD     D,H
911 02DC 5D                       LD     E,L
912 02DD ED 4B 00 00   E          LD     BC,(TIMER)
913 02E1 B7                       OR     A
914 02E2 ED 42                    SBC    HL,BC
915 02E4 F2 19 03      C          JP     P,DISINT
916 02E7
917                        ;* * * * * THEN
918                        ;* * * * * * IF
919                        ;* * * * * * * (HOOK DELAY TIMER > 4000)
920 02E7
921 02E7 21 A0 0F                 LD     HL,4000
```

```
922 02EA B7                             OR      A
923 02EB ED 52                          SBC     HL,DE
924 02ED DA F5 02      C                JP      C,SETHOK
925 02F0
926                         ;* * * * * OR
927                         ;* * * * * (TIMER SIGN = POSITIVE)
928 02F0
929 02F0 CB 78                          BIT     7,B
930 02F2 C2 18 03      C                JP      NZ,DISINT
931 02F5
932                         ;* * * * * THEN
933 02F5
934 02F5               SETHOK:
935 02F5
936                         ;* * * * * * HOOK INDICATOR FLAG = OFF HOOK
937 02F5
938 02F5 DD CB 01 BE                    RES     7,(IX+1)
939 02F9
940                         ;* * * * * END IF
941                         ;* * * * * END IF
942                         ;* * * * END IF
943 02F9
944 02F9 C3 18 03      C                JP      DISINT
945 02FC
946                         ;* * * ELSE
947 02FC
948 02FC               TESTHK:
949 02FC
950                         ;* * * * HOOK INDICATOR FLAG = ON HOOK
951 02FC
952 02FC DD CB 01 FE                    SET     7,(IX+1)
953 0300
954                         ;* * * * HOOK CONTROL FLAG = FALSE
955 0300
956 0300 DD CB 00 A6                    RES     4,(IX)
957 0304
958                         ;* * * * PUSH-TO-TALK FLAG = FALSE
959 0304
960 0304 DD CB 01 9E                    RES     3,(IX+1)
961 0308
962                         ;* * * * PUSH-TO-TALK LINE = LOW
963 0308
964 0308 3E 80                           LD      A,80H
965 030A D3 00         E                OUT     (.LOW.APRTAC),A
966 030C
967                         ;* * * * SIDETONE CONTROL LINE = FALSE
968 030C
969 030C 3E 10                           LD      A,10H
970 030E D3 00         E                OUT     (.LOW.APRTCC),A
971 0310
972                         ;* * * * VOX TRIGGER FLAG = FALSE
973 0310
974 0310 DD CB 01 96                    RES     2,(IX+1)
975 0314
976                         ;* * * * CODEC RECEIVE FLAG = FALSE
977 0314
978 0314 DD CB 00 8E                    RES     1,(IX)
979 0318
980                         ;* * * END IF
```

```
981  0318
982  0318                    DISINT:
983  0318
984                          ;* * * DISABLE ON/OFF HOOK INTERRUPT LINE
985  0318
986  0318 3A 00 00    E          LD    A,(INTMSK)
987  031B D3 BB                  OUT   (0BBH),A
988  031D FB                     EI
989  031E
990                          ;* * * IF
991                          ;* * * * ( TELEPHONE ADAPTER MODE = CLEAR )
992  031E
993  031E 21 00 00    E          LD    HL,CNTLDT
994  0321 CB 56                  BIT   2,(HL)
995  0323 CA 2D 03    C          JP    Z,KNOCKD
996  0326
997                          ;* * * * OR
998                          ;* * * * * ( HOLD OFF FLAG = TRUE )
999  0326
1000 0326 DD CB 00 5E            BIT   3,(IX)
1001 032A CA 40 03    C          JP    Z,DOCIFR
1002 032D
1003                         ;* * * THEN
1004 032D
1005 032D                    KNOCKD:
1006 032D
1007                         ;* * * * PUSH-TO-TALK FLAG = FALSE
1008 032D
1009 032D DD CB 01 9E            RES   3,(IX+1)
1010 0331
1011                         ;* * * * PUSH-TO-TALK LINE = LOW
1012 0331
1013 0331 3E 80                  LD    A,80H
1014 0333 D3 00       E          OUT   (.LOW.APRTAC),A
1015 0335
1016                         ;* * * * SIDETONE CONTROL LINE = FALSE
1017 0335
1018 0335 3E 10                  LD    A,10H
1019 0337 D3 00       E          OUT   (.LOW.APRTCC),A
1020 0339
1021                         ;* * * * VOX TRIGGER FLAG = FALSE
1022 0339
1023 0339 DD CB 01 96            RES   2,(IX+1)
1024 033D C3 7C 04    C          JP    EXIT
1025 0340
1026                         ;* * * ELSE
1027 0340
1028 0340                    DOCIFR:
1029 0340
1030                         ;* * * * IF
1031                         ;* * * * * TELEPHONE ADAPTER = OFF HOOK
1032 0340
1033 0340 DD CB 01 7E            BIT   7,(IX+1)
1034 0344 C2 7C 04    C          JP    NZ,EXIT
1035 0347
1036                         ;* * * * THEN
1037                         ;* * * * * TEST LOOP COUNT = 50
1038 0347
```

```
1039 0347 16 32              LD      D,50
1040 0349
1041                  ;* * * * * CYCLE COUNT = 00
1042 0349
1043 0349 1E 00              LD      E,0
1044 034B
1045                  ;* * * * * VOX TRIGGER SEARCH LOOP COUNT = 200 ( 5 MSEC )
1046 034B
1047 034B 06 C8              LD      B,200
1048 034D
1049                  ;* * * * * DO UNTIL ( VOX TRIGGER LINE = TRUE ) OR ( LOOP COUNT = 00 )
1050 034D
1051 034D            LOOP1:
1052 034D
1053                  ;* * * * * * LOOP COUNT = LOOP COUNT - 1
1054 034D
1055 034D 05                 DEC     B
1056 034E
1057                  ;* * * * * END UNTIL
1058 034E
1059 034E DB 00      E        IN      A,(.LOW.APRTB)
1060 0350 CA 57 03   C        JP      Z,TESTVT
1061 0353 CB 67               BIT     4,A
1062 0355 28 F6 034D          JR      Z,LOOP1
1063 0357
1064                  ;* * * * * IF
1065 0357
1066 0357            TESTVT:
1067 0357
1068                  ;* * * * * * PUSH-TO-TALK FLAG = FALSE
1069 0357
1070 0357 DD CB 01 5E         BIT     3,(IX+1)
1071 035B C2 00 04   C        JP      NZ,XMTCHK
1072 035E
1073                  ;* * * * * THEN
1074                  ;* * * * * * IF
1075                  ;* * * * * * * VOX TRIGGER LINE = ACTIVE
1076 035E
1077 035E CB 67               BIT     4,A
1078 0360 CA 7C 04   C        JP      Z,EXIT
1079 0363
1080                  ;* * * * * * THEN
1081                  ;* * * * * * * DO UNTIL ( TEST LOOP COUNT = 00 ) OR ( CYCLE COUNT = 15 )
1082 0363
1083 0363            TSLOOP:
1084 0363
1085                  ;* * * * * * * * TRIGGER HIGH LOOP COUNT = 45 ( 1 1/8 MSEC )
1086 0363
1087 0363 06 2D              LD      B,45
1088 0365
1089                  ;* * * * * * * * DO UNTIL ( VOX TRIG LINE = FALSE ) OR ( LOOP COUNT = 00 )
1090 0365
1091 0365            FALSEL:
1092 0365
1093                  ;* * * * * * * * * TRIGGER LOOP COUNT = TRIGGER LOOP COUNT - 1
1094 0365
1095 0365 05                 DEC     B
1096 0366
1097                  ;* * * * * * * * END UNTIL
```

```
1098 0366
1099 0366 DB 00         E        IN      A,(.LOW.APRTB)
1100 0368 CA 70 03      C        JP      Z,IMPVOX
1101 036B CB 67                  BIT     4,A
1102 036D C2 A5 03      C        JP      NZ,FALSEL
1103 0370
1104                          ;* * * * * * * IF
1105 0370
1106 0370                        IMPVOX:
1107 0370
1108                          ;* * * * * * * * VOX TRIGGER LINE = FALSE
1109 0370
1110 0370 CB 67                  BIT     4,A
1111 0372 C2 A5 03      C        JP      NZ,BADCY2
1112 0375
1113                          ;* * * * * * * THEN
1114                          ;* * * * * * * * TEST LOOP COUNT = 2 (15.625 uS * 2 = 31.25 uS)
1115 0375
1116 0375 06 02                  LD      B,2
1117 0377
1118                          ;* * * * * * * * DO UNTIL (TST LUP CNT = 00 ) OR ( VOX TRIG = TRUE )
1119 0377
1120 0377                        LOOKTG:
1121 0377
1122                          ;* * * * * * * * * TEST LOOP COUNT = TEST LOOP COUNT - 1
1123 0377
1124 0377 05                     DEC     B
1125 0378
1126                          ;* * * * * * * END UNTIL
1127 0378
1128 0378 DB 00         E        IN      A,(.LOW.APRTB)
1129 037A 28 05 0381             JR      Z,CONTIN
1130 037C CB 67                  BIT     4,A
1131 037E CA 77 03      C        JP      Z,LOOKTG
1132 0381
1133                          ;* * * * * * * * IF
1134 0381
1135 0381                        CONTIN:
1136 0381
1137                          ;* * * * * * * * VOX TRIGGER LINE = FALSE
1138 0381
1139 0381 CB 67                  BIT     4,A
1140 0383 C2 A1 03      C        JP      NZ,BADCY1
1141 0386
1142                          ;* * * * * * * * THEN
1143                          ;* * * * * * * * LOOP COUNT = 120
1144 0386
1145 0386 01 78 00               LD      BC,120
1146 0389
1147                          ;* * * * * * * * * DO UNTIL ( VOX TRIGGER = TRUE ) OR ( LOOP COUNT = 00 )
1148 0389
1149 0389                        TRUELP:
1150 0389
1151                          ;* * * * * * * * * LOOP COUNT = LOOP COUNT - 1
1152 0389
1153 0389 0B                     DEC     BC
1154 038A 79                     LD      A,C
1155 038B B0                     OR      B
1156 038C
1157                          ;* * * * * * * * END UNTIL
```

```
1158 038C
1159 038C DB 00           E           IN      A,(.LOW.APRTR)
1160 038E 28 05 0395                  JR      Z,LDLOOP
1161 0390 CB 67                       BIT     4,A
1162 0392 CA 89 03        C           JP      Z,TRUELP
1163 0395
1164                           ;* * * * * * * * * IF
1165 0395
1166 0395                     LDLOOP:
1167 0395
1168                           ;* * * * * * * * * VOX TRIGGER LINE = TRUE
1169 0395
1170 0395 CB 67                       BIT     4,A
1171 0397 CA 9D 03        C           JP      Z,BADCYC
1172 039A
1173                           ;* * * * * * * * * THEN
1174                           ;* * * * * * * * * CYCLE COUNT = CYCLE COUNT + 1
1175 039A
1176 039A 1C                          INC     E
1177 039B 18 0A 03A7                  JR      CHKCNT
1178 039D
1179                           ;* * * * * * * * * ELSE
1180 039D
1181 039D                     BADCYC:
1182 039D
1183                           ;* * * * * * * * * CYCLE COUNT = 00
1184 039D
1185 039D 1E 00                       LD      E,0
1186 039F 18 06 03A7                  JR      CHKCNT
1187 03A1
1188                           ;* * * * * * * * * END IF
1189                           ;* * * * * * * * * ELSE
1190 03A1
1191 03A1                     BADCY1:
1192 03A1
1193                           ;* * * * * * * * * CYCLE COUNT = 00
1194 03A1
1195 03A1 1E 00                       LD      E,0
1196 03A3 18 02 03A7                  JR      CHKCNT
1197 03A5
1198                           ;* * * * * * * * * END IF
1199                           ;* * * * * * * * * ELSE
1200 03A5
1201 03A5                     BADCY2:
1202 03A5
1203                           ;* * * * * * * * * CYCLE COUNT = 00
1204 03A5
1205 03A5 1E 00                       LD      E,0
1206 03A7
1207                           ;* * * * * * * * * END IF
1208 03A7
1209 03A7                     CHKCNT:
1210 03A7
1211                           ;* * * * * * * * * TEST LOOP COUNT = TEST LOOP COUNT - 1
1212 03A7
1213 03A7 15                          DEC     D
1214 03A8
1215                           ;* * * * * * * * * END UNTIL
```

```
1216 03A8
1217 03A8 28 05 03AF            JR      Z,TSCYCL
1218 03AA 7B                    LD      A,E
1219 03AB FE 0F                 CP      15
1220 03AD 20 B4 0363            JR      NZ,TSLOOP
1221 03AF
1222                     ;* * * * * * CHECK FOR SUFFICIENT GOOD CYCLES
1223 03AF
1224 03AF               TSCYCL:
1225 03AF
1226                     ;* * * * * * IF
1227                     ;* * * * * * * CYCLE COUNT > 14
1228 03AF
1229 03AF 7B                    LD      A,E
1230 03B0 FE 0F                 CP      15
1231 03B2 FA 7C 04    C         JP      M,EXIT
1232 03B5
1233                     ;* * * * * * THEN
1234                     ;* * * * * * * TRANMIT DELAY TIMER = .135 MILLISECONDS
1235 03B5
1236 03B5 2A 00 00    E         LD      HL,(TIMER)
1237 03B8 11 38 04              LD      DE,1080
1238 03BB 19                    ADD     HL,DE
1239 03BC 22 00 00    E         LD      (XMTTIM),HL
1240 03BF
1241                     ;* * * * * * BACK BUF POINTER = FRONT POINTER - 70 MSEC
1242 03BF
1243 03BF F3                    DI
1244 03C0 D9                    EXX
1245 03C1 21 D0 FD              LD      HL,-560
1246 03C4 19                    ADD     HL,DE
1247 03C5 44                    LD      B,H
1248 03C6 4D                    LD      C,L
1249 03C7
1250                     ;* * * * * * IF
1251                     ;* * * * * * * BACK POINTER < VOICE BUFFER START ADDRESS
1252 03C7
1253 03C7 21 00 00    E         LD      HL,VOICEB
1254 03CA B7                    OR      A
1255 03CB ED 42                 SBC     HL,BC
1256 03CD FA D9 03    C         JP      M,RESINT
1257 03D0
1258                     ;* * * * * * THEN
1259                     ;* * * * * * * BACK POINTER = END OF BUFFER - DIFFERENCE
1260 03D0
1261 03D0 44                    LD      B,H
1262 03D1 4D                    LD      C,L
1263 03D2 21 00 00    E         LD      HL,ENDBUF
1264 03D5 ED 42                 SBC     HL,BC
1265 03D7 44                    LD      B,H
1266 03D8 4D                    LD      C,L
1267 03D9
1268                     ;* * * * * * END IF
1269 03D9
1270 03D9               RESINT:
1271 03D9
1272                     ;* * * * * * RESTORE INTERRUPT OPERATION
1273 03D9
```

```
1274 03D9 D9                              EXX
1275 03DA FB                              EI
1276 03DB
1277                            ;* * * * * * * PUSH-TO-TALK = TRUE
1278 03DB
1279 03DB DD CB 01 DE                     SET    3,(IX+1)
1280 03DF
1281                            ;* * * * * * * PUSH-TO-TALK LINE = TRUE
1282 03DF
1283 03DF 3E 80                           LD     A,80H
1284 03E1 D3 00         E                 OUT    (.LOW.APRTAS),A
1285 03E3
1286                            ;* * * * * * * IF
1287                            ;* * * * * * * ( ALARM FLAG = FALSE )
1288 03E3
1289 03E3 CB 46                           BIT    0,(HL)
1290 03E5 28 0B 03F2                      JR     Z,LOADDY
1291 03E7
1292                            ;* * * * * * * AND
1293                            ;* * * * * * * ( SIDETONE FLAG = TRUE )
1294 03E7
1295 03E7 21 02 00      E                 LD     HL,DISPLY+2
1296 03EA CB 76                           BIT    6,(HL)
1297 03EC 28 04 03F2                      JR     Z,LOADDY
1298 03EE
1299                            ;* * * * * * * THEN
1300                            ;* * * * * * * SIDETONE CONTROL LINE = TRUE
1301 03EE
1302 03EE 3E 10                           LD     A,10H
1303 03F0 D3 00         E                 OUT    (.LOW.APRTCS),A
1304 03F2
1305                            ;* * * * * * * END IF
1306 03F2
1307 03F2              LOADDY:
1308 03F2
1309                            ;* * * * * * * VOX DELAY = TIMER + FACTOR
1310 03F2
1311 03F2 2A 00 00      E                 LD     HL,(TIMER)
1312 03F5 ED 4B 00 00   E                 LD     BC,(FACTOR)
1313 03F9 09                               ADD    HL,BC
1314 03FA 22 00 00      E                 LD     (VOXDLY),HL
1315 03FD C3 7C 04      C                 JP     EXIT
1316 0400
1317                            ;* * * * * * END IF
1318                            ;* * * * * END IF
1319                            ;* * * * * ELSE
1320 0400
1321 0400              XMTCHK:
1322 0400
1323                            ;* * * * * * IF
1324                            ;* * * * * * TRANSMIT DELAY TIMER < TIMER
1325 0400
1326 0400 2A 00 00      E                 LD     HL,(XMTTIM)
1327 0403 54                               LD     D,H
1328 0404 5D                               LD     E,L
1329 0405 ED 4B 00 00   E                 LD     BC,(TIMER)
1330 0409 B7                               OR     A
1331 040A ED 42                            SBC    HL,BC
```

```
1332 040C F2 21 04      C           JP      P,CHKTRG
1333 040F
1334                                ;* * * * * THEN
1335                                ;* * * * * * IF
1336                                ;* * * * * * * ( TRANSMIT DELAY TIMER > 1080 )
1337 040F
1338 040F 21 38 04                  LD      HL,1080
1339 0412 B7                        OR      A
1340 0413 ED 52                     SBC     HL,DE
1341 0415 DA 1D 04     C            JP      C,SETXMT
1342 0418
1343                                ;* * * * * * OR
1344                                ;* * * * * * * ( TIMER SIGN = POSITIVE )
1345 0418
1346 0418 CB 78                     BIT     7,B
1347 041A C2 21 04     C            JP      NZ,CHKTRG
1348 041D
1349                                ;* * * * * * THEN
1350 041D
1351 041D              SETXMT:
1352 041D
1353                                ;* * * * * * * CODEC TRANSMIT FLAG = TRUE
1354 041D
1355 041D DD CB 00 C6              SET     0,(IX)
1356 0421
1357                                ;* * * * * * END IF
1358                                ;* * * * * * END IF
1359 0421
1360 0421              CHKTRG:
1361 0421
1362                                ;* * * * * VOX TRIGGER SEARCH LOOP COUNT = 80  ( 2 MSEC )
1363 0421
1364 0421 06 50                     LD      B,80
1365 0423
1366                                ;* * * * * * DO UNTIL ( VOX TRIGGER LINE = TRUE ) OR ( LOOP COUNT = 00 )
1367 0423
1368 0423              LOOP2:
1369 0423
1370                                ;* * * * * * * LOOP COUNT = LOOP COUNT - 1
1371 0423
1372 0423 05                        DEC     B
1373 0424
1374                                ;* * * * * END UNTIL
1375 0424
1376 0424 DB 00                     IN      A,(.LOW.APRTB)
1377 0426 CA 2D 04     C            JP      Z,TSTVTG
1378 0429 CB 67                     BIT     4,A
1379 042B 28 F6 0423               JR      Z,LOOP2
1380 042D
1381                                ;* * * * * IF
1382 042D
1383 042D              TSTVTG:
1384 042D
1385                                ;* * * * * * VOX TRIGGER LINE = ACTIVE
1386 042D
1387 042D CB 67                     BIT     4,A
1388 042F 28 1A 044B               JR      Z,TESTDY
1389 0431
```

```
1390                    ;* * * * * THEN
1391                    ;* * * * * * * LOAD VOX DELAY FACTOR
1392 0431
1393 0431 ED 4B 00 00  E         LD    BC,(FACTOR)
1394 0435
1395                    ;* * * * * * IF
1396                    ;* * * * * * * SIDETONE = DISABLED
1397 0435
1398 0435 21 02 00     E         LD    HL,DISPLY+2
1399 0438 CB 76                   BIT   6,(HL)
1400 043A 20 08 0444              JR    NZ,NODIVD
1401 043C
1402                    ;* * * * * * THEN
1403                    ;* * * * * * * FACTOR = FACTOR / 4
1404 043C
1405 043C CB 38                   SRL   B
1406 043E CB 19                   RR    C
1407 0440 CB 38                   SRL   B
1408 0442 CB 19                   RR    C
1409 0444
1410                    ;* * * * * * END IF
1411 0444
1412 0444              NODIVD:
1413 0444
1414                    ;* * * * * * * VOX DELAY = TIMER + FACTOR
1415 0444
1416 0444 2A 00 00     E         LD    HL,(TIMER)
1417 0447 09                      ADD   HL,BC
1418 0448 22 00 00     E         LD    (VOXDLY),HL
1419 044B
1420                    ;* * * * * END IF
1421 044B
1422 044B              TESTDY:
1423 044B
1424                    ;* * * * * IF
1425                    ;* * * * * * VOX DELAY TIMER < TIMER
1426 044B
1427 044B 2A 00 00     E         LD    HL,(VOXDLY)
1428 044E 54                      LD    D,H
1429 044F 5D                      LD    E,L
1430 0450 ED 4B 00 00  E         LD    BC,(TIMER)
1431 0454 B7                      OR    A
1432 0455 ED 42                   SBC   HL,BC
1433 0457 F2 70 04     C         JP    P,EXIT
1434 045A
1435                    ;* * * * * THEN
1436                    ;* * * * * IF
1437                    ;* * * * * * ( VOX DELAY TIMER > FACTOR )
1438 045A
1439 045A 2A 00 00     E         LD    HL,(FACTOR)
1440 045D B7                      OR    A
1441 045E ED 52                   SBC   HL,DE
1442 0460 DA 68 04     C         JP    C,CLRPTT
1443 0463
1444                    ;* * * * * OR
1445                    ;* * * * * * ( TIMER SIGN = POSITIVE )
1446 0463
1447 0463 CB 78                   BIT   7,B
```

```
1448 0465 C2 7C 04      C              JP      NZ,EXIT
1449 0468
1450                            ;* * * * * * THEN
1451 0468
1452 0468                       CLRPTT:
1453 0468
1454                            ;* * * * * * * PUSH-TO-TALK FLAG = FALSE
1455 0468
1456 0468 DD CB 01 9E                 RES     3,(IX+1)
1457 046C
1458                            ;* * * * * * * PUSH-TO-TALK LINE = LOW
1459 046C
1460 046C 3E 80                        LD      A,80H
1461 046E D3 00         E              OUT     (.LOW.APRTAC),A
1462 0470
1463                            ;* * * * * * * SIDETONE CONTROL LINE = FALSE
1464 0470
1465 0470 3E 10                        LD      A,10H
1466 0472 D3 00         E              OUT     (.LOW.APRTCC),A
1467 0474
1468                            ;* * * * * * * VOX TRIGGER FLAG = FALSE
1469 0474
1470 0474 DD CB 01 96                  RES     2,(IX+1)
1471 0478
1472                            ;* * * * * * * CODEC RECEIVE FLAG = FALSE
1473 0478
1474 0478 DD CB 00 8E                  RES     1,(IX)
1475 047C
1476                            ;* * * * * * END IF
1477                            ;* * * * * * END IF
1478                            ;* * * * * END IF
1479                            ;* * * * END IF
1480                            ;* * * END IF
1481 047C
1482 047C                       EXIT:
1483 047C
1484                            ;* * * ALARM CONTROL FLAG = FALSE
1485 047C
1486 047C DD CB 01 A6                  RES     4,(IX+1)
1487 0480
1488                            ;* * END UNTIL
1489 0480
1490 0480 C3 FA 00      C              JP      MAIN
1491 0483
1492                            ;* END PROCEDURE
1493 0483
1494 0483                              END

ERRORS = 0000

ADDRA  E 0004    ALMON  C 012C    APRTA  E 0009    APRTAC E 001F
  APRTAS E 0020    APRTB  E 0007    APRTBC E 0006    APRTBS E 000D
  APRTCC E 001D    APRTCS E 001E    BACKRF E 000B    BADCY1 C 03A1
  BADCY2 C 03A5    BADCYC C 039D    BEGIN  C 0068    BITNUM E 0014
  CHKALM C 024A    CHKCLK C 0286    CHKCNT C 03A7    CHKFIL C 0273
  CHKHOK C 02D2    CHKIND C 0239    CHKMOD C 00D4    CHKPUS C 025A
```

| | | | |
|---|---|---|---|
| CHKSID C 0294 | CHKTRG C 0421 | CKHOOK C 02AF | CLKFLT E 0025 |
| CLKOFF C 0292 | CLOCKI E 0000 | CLRALM C 0258 | CLRIND C 0248 |
| CLRPTT C 0468 | CLRPUB C 0267 | CLRSID C 02AD | CNTLBF E 0010 |
| CNTLDT E 000E | CODECC C 0005 | CODECI C 0001 | CODFLG E 0002 |
| CONTIN C 0381 | CPUBLC C 0136 | DISINT C 0318 | DISPLY E 000F |
| DOCIFR C 0340 | ENDBUF E 0024 | EXIT C 047C | FACTOR E 0021 |
| FALSEL C 0365 | FILOFF C 0284 | FLTZER C 0121 | FRONTB E 000A |
| HOKTIM E 0027 | IMPVOX C 0370 | INTMSK E 0008 | KNOCKD C 032D |
| LDLOOP C 0395 | LOADDY C 03F2 | LOKPTT C 01D1 | LOOKTG C 0377 |
| LOOP1 C 034D | LOOP2 C 0423 | MAIN C 00FA | MEMORY M 0000 |
| NALARM C 0130 | NODIVD C 0444 | NOFILL C 0119 | NOPUBL C 01A7 |
| NOTACK C 017D | NOTCLR C 01BD | NOTEST C 0172 | NRELAY C 018D |
| NTFILL C 0156 | PEACEQ C 0000 | RELAYO C 018B | RESINT C 03D9 |
| SETHOK C 02F5 | SETXMT C 041D | STACK S 0000 | START0 E 0015 |
| STCK E 000C | SWITCH E 0026 | SWTIME E 0012 | SYSSTS E 0013 |
| T0CMD E 0018 | T0HIGH E 0017 | T0LOW E 0016 | T1CMD E 0019 |
| T1HIGH E 001B | T1LOW E 001A | TESTDY C 044B | TESTHK C 02FC |
| TESTLP C 01FC | TESTVT C 0357 | TIMER E 0011 | TRUELP C 0389 |
| TSCYCL C 03AF | TSLOOP C 0363 | TSTVTG C 042D | VOICEB E 0003 |
| VOXDLY E 0022 | VXTIME E 001C | XMTCHK C 0400 | XMTTIM E 0023 |

```
  1 0000                    TITLE      'SERVICE SWITCHES.SRC
  2              ;****************************************************
  3              ;*                                                  *
  4              ;*    NAME: SERVICE SWITCHES    (SWITCH)  PPS REF   *
  5              ;*                                                  *
  6              ;*    FILENAME: SWITCH.SRC                          *
  7              ;*                                                  *
  8              ;*    FUNCTION: THIS MODULE READS THE PANEL SWITCHES ON THE TA. WHEN A *
  9              ;*              CHANGE IS DETECTED, A 3 MILLISECOND DEBOUNCE TIMER IS  *
 10              ;*              STARTED. AFTER THE 3 MILLISECOND DELAY A NEW COPY OF THE *
 11              ;*              SWITCHES IS READ A STORED. STATUS DATA IN MEMORY IS UPDATED*
 12              ;*              TO REFLECT SWITCH CHANGES. THE SPECIAL CASE OF WHEN THE *
 13              ;*              FILL INIT AND PUBLIC KEY INIT BUTTONS ARE PUSHED AT THE *
 14              ;*              SAME TIME IS CHECKED FOR ALSO. WHEN THIS CONDITION IS DE- *
 15              ;*              TECTED, THE TEST MODE IS INITIATED.                    *
 16              ;*                                                  *
 17              ;*    METHOD:                                       *
 18              ;*                                                  *
 19              ;*    INPUT PARAMETERS:                             *
 20              ;*    NAME    DESCRIPTION            TYPE    LENGTH   RANGE   *
 21              ;*                                                  *
 22              ;*    SYSFLG  (IX) IS SYSTEM STATUS FLAGS  RECORD  16 BITS   N/A    *
 23              ;*                                                  *
 24              ;*    OUTPUT PARAMETERS:                            *
 25              ;*    NAME    DESCRIPTION            TYPE    LENGTH   RANGE   *
 26              ;*                                                  *
 27              ;*    NONE                                          *
 28              ;*                                                  *
 29              ;*    DATA ACCESSED OR ALTERED EXTERNAL TO MODULE:  *
 30              ;*    NAME    DESCRIPTION            TYPE    LENGTH   RANGE  DIRECTION *
 31              ;*                                                  *
 32              ;*    CNTLBF  BUFFER SWITCH DATA     RECORD  8 BITS    N/A    BOTH   *
 33              ;*    CNTLDT  CONTROL DATA FOR VP-120 RECORD  3 BYTES  N/A    BOTH   *
 34              ;*    APRTA   PANEL SWITCH LINES     RECORD  8 BITS    N/A    INPUT  *
 35              ;*    SWCHNG  SWITCH CHANGED FLAG    BOOLEAN 1 BIT     N/A    BOTH   *
 36              ;*    TIMER   CODEC INT DRIVEN TIMER INTEGER 2 BYTES  0-65536 INPUT. *
```

```
37               ;*    SWTIME  SWITCH BOUNCE TIMER     INTEGER  2 BYTES  0-65536  BOTH    *
38               ;*    SYSSTS  COPY OF PANEL SWITCHES  RECORD   8 BITS   N/A      BOTH    *
39               ;*    FINTLH  FILL INIT LATCH FLAG    BOOLEAN  1 BIT    N/A      OUTPUT  *
40               ;*                                                                       *
41               ;*    RESTRICTIONS:                                                      *
42               ;*                                                                       *
43               ;*    SUPPORTING MODULES: NONE                                           *
44               ;*                                                                       *
45               ;*    COPYRIGHT 1984  ROCKWELL INTERNATIONAL                             *
46               ;*    COLLINS TELECOMMUNICATIONS PRODUCTS DIVISION                       *
47               ;*                                                                       *
48               ;*    AUTHOR: D.E. EICHER                       DATE: 01/25/84           *
49               ;*                                                                       *
50               ;*    VERSION: 1.0                                                       *
51               ;*                                                                       *
52               ;*    REVISIONS:                                DATE:                    *
53               ;*                                                                       *
54               ;*********************************************************************
55 0000
56                            CSEG
                               NAME        SWITCH
57
58 0000
59                             PUBLIC      SWITCH
60 0000
61                             EXTRN       CNTLBF,CNTLDT,APRTA,APRTB,TIMER,SWTIME,SYSSTS
62 0000
63               ;* PROCEDURE SWITCH
64 0000
65 0000          SWITCH:
66 0000
67               ;* * CONTROL SWITCH BUFFER = DESTINATION ADDRESS
68 0000
69 0000 21 00 00    E         LD    HL,CNTLBF
70 0003
71               ;* * POINT TO CONTROL DATA
72 0003
73 0003 FD 21 00 00 E         LD    IY,CNTLDT
74 0007
75               ;* * READ SWITCH DATA FROM PORT A
76 0007
77 0007 DB 00      E          IN    A,(.LOW.APRTA)
78 0009
79               ;* * IF
80               ;* * * (SWITCH DATA HAS CHANGED)
81 0009
82 0009 E6 7F                AND    07FH
83 000B BE                   CP     (HL)
84 000C 77                   LD     (HL),A
85 000D C2 22 00   C         JP     NZ,CHKCHG
86 0010 DB 00      E         IN     A,(.LOW.APRTB)
87 0012 2F                   CPL
88 0013 E6 02                AND    02H
89 0015 47                   LD     B,A
90 0016 FD 7E 02             LD     A,(IY+2)
91 0019 0F                   RRCA
92 001A 0F                   RRCA
93 001B 0F                   RRCA
94 001C E6 02                AND    02H
```

```
 95 001E A8                         XOR     B
 96 001F CA 37 00      C            JP      Z,NOTCHG
 97 0022
 98                         ;* * AND
 99 0022
100 0022                   CHKCHG:
101 0022
102                         ;* * * ( CHANGE FLAG = FALSE )
103 0022
104 0022 DD CB 00 56                BIT     2,(IX)
105 0026 C2 37 00      C            JP      NZ,NOTCHG
106 0029
107                         ;* * THEN
108                         ;* * * CHANGE FLAG = TRUE
109 0029
110 0029 DD CB 00 D6                SET     2,(IX)
111 002D
112                         ;* * * SWITCH BOUNCE COUNT = 3 MILLISECONDS
113 002D
114 002D 2A 00 00      E            LD      HL,(TIMER)
115 0030 01 18 00                   LD      BC,24
116 0033 09                         ADD     HL,BC
117 0034 22 00 00      E            LD      (SWTIME),HL
118 0037
119                         ;* * END IF
120 0037
121 0037                   NOTCHG:
122 0037
123                         ;* * IF
124                         ;* * * ( CHANGE FLAG = TRUE )
125 0037
126 0037 DD CB 00 56                BIT     2,(IX)
127 003B CA F2 00      C            JP      Z,EXIT
128 003E
129                         ;* * AND
130                         ;* * * ( SWITCH BOUNCE TIMER < TIMER )
131 003E
132 003E B7                         OR      A
133 003F 2A 00 00      E            LD      HL,(SWTIME)
134 0042 54                         LD      D,H
135 0043 5D                         LD      E,L
136 0044 ED 4B 00 00   E            LD      BC,(TIMER)
137 0048 ED 42                      SBC     HL,BC
138 004A F2 F2 00      C            JP      P,EXIT
139 004D
140                         ;* * THEN
141                         ;* * * IF
142                         ;* * * * ( SWITCH BOUNCE TIMER > 24 COUNTS )
143 004D
144 004D 21 18 00                   LD      HL,24
145 0050 B7                         OR      A
146 0051 ED 52                      SBC     HL,DE
147 0053 DA 5B 00      C            JP      C,CLRCHG
148 0056
149                         ;* * * OR
150                         ;* * * * ( TIMER SIGN = POSITIVE )
151 0056
152 0056 CB 78                      BIT     7,B
```

```
153 0058 C2 F2 00     C           JP      NZ,EXIT
154 005B
155                           ;* * * THEN
156 005B
157 005B                      CLRCHG:
158 005B
159                           ;* * * * CHANGE FLAG = FALSE
160 005B
161 005B DD CB 00 96              RES     2,(IX)
162 005F
163                           ;* * * * READ SECURE 2 BIT
164 005F
165 005F DB 00       E            IN      A,(.LOW.APRTB)
166 0061
167                           ;* * * * IF
168                           ;* * * * * SECURE 2 BIT = TRUE
169 0061
170 0061 CB 4F                     BIT     1,A
171 0063 CA 6D 00    C             JP      Z,CLRTWO
172 0066
173                           ;* * * * THEN
174                           ;* * * * * ALGM CONTROL BIT = 2
175 0066
176 0066 FD CB 02 A6              RES     4,(IY+2)
177 006A C3 71 00    C             JP      CHKSWH
178 006D
179                           ;* * * * ELSE
180 006D
181 006D                       CLRTWO:
182 006D
183                           ;* * * * * ALGM CONTROL BIT = 1
184 006D
185 006D FD CB 02 E6              SET     4,(IY+2)
186 0071
187                           ;* * * * END IF
188 0071
189 0071                       CHKSWH:
190 0071
191                           ;* * * * READ NEW COPY OF SWITCHES
192 0071
193 0071 DB 00       E            IN      A,(.LOW.APRTA)
194 0073 E6 7F                    AND     07FH
195 0075 32 00 00    E            LD      (CNTLBF),A
196 0078
197                           ;* * * * SYSTEM STATUS = PANEL SWITCH DATA
198 0078
199 0078 32 00 00    E            LD      (SYSSTS),A
200 007B
201                           ;* * * * IF
202                           ;* * * * * FILL INITIATE BUTTON = ACTIVE
203 007B
204 007B CB 47                    BIT     0,A
205 007D C2 A3 00    C            JP      NZ,CKMODE
206 0080
207                           ;* * * * THEN
208                           ;* * * * * IF
209                           ;* * * * * * PUBLIC KEY INIT BUTTON = ACTIVE
210 0080
```

```
211 0080 CB 77                          BIT     6,A
212 0082 C2 9C 00        C              JP      NZ,DOFILL
213 0085
214                                     ;* * * * THEN
215                                     ;* * * * * SELF TEST MODE = TRUE
216 0085
217 0085 FD CB 01 86                    RES     0,(IY+1)
218 0089
219                                     ;* * * * * PUBLIC KEY INIT = FALSE
220 0089
221 0089 FD CB 02 AE                    RES     5,(IY+2)
222 008D DD CB 01 8E                    RES     1,(IX+1)
223 0091
224                                     ;* * * * * KEY FILL INIT = FALSE
225 0091
226 0091 DD CB 01 86                    RES     0,(IX+1)
227 0095 FD CB 00 C6                    SET     0,(IY)
228 0099 C3 AF 00        C              JP      PUBLIC
229 009C
230                                     ;* * * * ELSE
231 009C
232 009C                         DOFILL:
233 009C
234                                     ;* * * * * FILL INIT LATCH FLAG = TRUE
235 009C
236 009C DD CB 01 C6                    SET     0,(IX+1)
237 00A0 C3 AF 00        C              JP      PUBLIC
238 00A3
239                                     ;* * * * END IF
240                                     ;* * * * ELSE
241 00A3
242 00A3                         CKMODE:
243 00A3
244                                     ;* * * * IF
245                                     ;* * * * * PUBLIC INITIATE SWITCH = ACTIVE
246 00A3
247 00A3 3A 00 00        E              LD      A,(CNTLBF)
248 00A6 CB 77                          BIT     6,A
249 00A8 C2 AF 00        C              JP      NZ,PUBLIC
250 00AB
251                                     ;* * * * THEN
252                                     ;* * * * * PUBLIC INITIATE LATCH BIT = TRUE
253 00AB
254 00AB DD CB 01 CE                    SET     1,(IX+1)
255 00AF
256                                     ;* * * * END IF
257                                     ;* * * * END IF
258 00AF
259 00AF                         PUBLIC:
260 00AF
261                                     ;* * * IF
262                                     ;* * * * CIPHER/PLAIN SWITCH = CIPHER
263 00AF
264 00AF CB 6F                          BIT     5,A
265 00B1 CA BB 00        C              JP      Z,PLAINT
266 00B4
267                                     ;* * * THEN
268                                     ;* * * * CIPHER/PLAIN MODE BIT = CIPHER
```

```
269 00B4
270 00B4 FD CB 00 D6              SET     2,(IY)
271 00B8 C3 BF 00      C          JP      CHECKP
272 00BB
273                               ;* * * ELSE
274 00BB
275 00BB                          PLAINT:
276 00BB
277                               ;* * * * CIPHER/PLAIN MODE BIT = PLAIN
278 00BB
279 00BB FD CB 00 96              RES     2,(IY)
280 00BF
281                               ;* * * END IF
282 00BF
283 00BF                          CHECKP:
284 00BF
285                               ;* * * * IF
286                               ;* * * * * PUBLIC KEY MODE = ACTIVE
287 00BF
288 00BF 47                       LD      B,A
289 00C0 2F                       CPL
290 00C1 E6 1E                    AND     1EH
291 00C3 FE 02                    CP      02H
292 00C5 C2 D7 00     C           JP      NZ,CLEARP
293 00C8
294                               ;* * * * THEN
295                               ;* * * * * PUBLIC KEY CONTROL BIT = TRUE
296 00C8
297 00C8 FD CB 02 F6              SET     6,(IY+2)
298 00CC
299                               ;* * * * * SET KEY VARIABLE CODE TO PUBLIC
300 00CC
301 00CC FD 7E 01                 LD      A,(IY+1)
302 00CF E6 8F                    AND     8FH
303 00D1 FD 77 01                 LD      (IY+1),A
304 00D4 C3 F2 00     C           JP      EXIT
305 00D7
306                               ;* * * * ELSE
307 00D7
308 00D7                          CLEARP:
309 00D7
310                               ;* * * * * PUBLIC KEY CONTROL BIT = FALSE
311 00D7
312 00D7 FD CB 02 B6              RES     6,(IY+2)
313 00DB
314                               ;* * * * * POSITION NEW KEY VARIABLE SWITCH DATA
315 00DB
316 00DB 78                       LD      A,B
317 00DC C6 04                    ADD     A,04H
318 00DE 0F                       RRCA
319 00DF 4F                       LD      C,A
320 00E0
321                               ;* * * * * POSITION CONTROL DATA KEY VARIABLE
322 00E0
323 00E0 FD 7E 01                 LD      A,(IY+1)
324 00E3 0F                       RRCA
325 00E4 0F                       RRCA
326 00E5 0F                       RRCA
```

```
327 00E6 0F                          RRCA
328 00E7
329                         ;* * * * SHIFT LOOP COUNT = 3
330 00E7
331 00E7 06 03                       LD      B,3
332 00E9
333                         ;* * * * DO UNTIL SHIFT LOOP COUNT = 00
334 00E9
335 00E9               SHIFTL:
336 00E9
337                         ;* * * * * SHIFT BIT OF SWITCH DATA TO CARRY
338 00E9
339 00E9 CB 09                       RRC     C
340 00EB
341                         ;* * * * * SHIFT BIT INTO CONTROL DATA BYTE
342 00EB
343 00EB 1F                          RRA
344 00EC
345                         ;* * * * * SHIFT LOOP COUNT = SHIFT LOOP COUNT - 1
346                         ;* * * * END UNTIL
347 00EC
348 00EC 10 FB 00E9                  DJNZ    SHIFTL
349 00EE
350                         ;* * * * RESTORE CONTROL DATA POSITION
351 00EE
352 00EE 0F                          RRCA
353 00EF
354                         ;* * * * STORE CONTROL DATA
355 00EF
356 00EF FD 77 01                    LD      (IY+1),A
357 00F2
358                         ;* * * * END IF
359                         ;* * * END IF
360                         ;* * END IF
361 00F2
362 00F2                EXIT:
363 00F2
364                         ;* END PROCEDURE
365 00F2
366 00F2 C9                          RET
367 00F3
368 00F3                             END

ERRORS = 0000

APRTA  E 0002   APRTB  E 0003   CHECKP C 00BF   CHKCHG C 0022
CHKSWH C 0071   CKMODE C 00A3   CLEARP C 0007   CLRCHG C 005B
CLRTWO C 006D   CNTLBF E 0000   CNTLDT E 0001   DOFILL C 009C
EXIT   C 00F2   MEMORY M 0000   NOTCHG C 0037   PLAINT C 00BB
PUBLIC C 00AF   SHIFTL C 00E9   STACK  S 0000   SWITCH C 0000
SWTIME E 0005   SYSSTS E 0006   TIMER  E 0004
```

```
 1 0000              TITLE           'CODEC INT SERVICE
 2           ;**********************************************************
 3           ;*                                                        *
 4           ;*    NAME: CODEC INTERRUPT SERVICE ROUTINE      PPS REF  *
 5           ;*                                                        *
 6           ;*    FILENAME: CODECI.SRC                                *
 7           ;*                                                        *
 8           ;*    FUNCTION: SERVICE THE CODEC INTERRUPT. THIS INTERRUPT OCCURS AT AN *
 9           ;*              8 KHZ RATE. IF THE RECEIVE FLAG IS TRUE DATA IS READ FROM *
10           ;*              THE CODEC AND STORED IN THE VOICE BUFFER. IF THE TRANSMIT *
11           ;*              FLAG IS TRUE, DATA IS TRANSMITTED FROM THE VOICE BUFFER AS *
12           ;*              LONG AS THERE IS DATA IN THE BUFFER.      *
13           ;*                                                        *
14           ;*    METHOD:                                             *
15           ;*                                                        *
16           ;*    INPUT PARAMETERS:                                   *
17           ;*    NAME    DESCRIPTION              TYPE    LENGTH    RANGE  *
18           ;*                                                        *
19           ;*    NONE                                                *
20           ;*                                                        *
21           ;*    OUTPUT PARAMETERS:                                  *
22           ;*    NAME    DESCRIPTION              TYPE    LENGTH    RANGE  *
23           ;*                                                        *
24           ;*    NONE                                                *
25           ;*                                                        *
26           ;*    DATA ACCESSED OF ALTERED EXTERNAL TO MODULE:        *
27           ;*    NAME    DESCRIPTION              TYPE    LENGTH    RANGE     DIRECTION *
28           ;*                                                        *
29           ;*    CNTLDT  REMOTE CONTROL DATA      RECORD  3 BYTES   N/A       INPUT     *
30           ;*    CODFLG  CODEC CONTROL FLAGS      RECORD  3 BITS    N/A       INPUT     *
31           ;*    VOICEB  VOICE BUFFER POINTERS    INTEGER 16 BITS   0-65536   BOTH      *
32           ;*    RSTCOD  RESET CODEC INT LINE     BOOLEAN 1 BIT     N/A       OUTPUT    *
33           ;*                                                        *
34           ;*    RESTRICTIONS:                                       *
35           ;*                                                        *
36           ;*    SUPPORTING MODULES: NONE                            *
37           ;*                                                        *
38           ;*    COPYRIGHT 1983  ROCKWELL INTERNATIONAL              *
39           ;*    COLLINS TELECOMMUNICATIONS PRODUCTS DIVISION        *
40           ;*                                                        *
41           ;*    AUTHOR: D.E. EICHER             DATE: 11/11/83      *
42           ;*                                                        *
43           ;*    VERSION: 1.0                                        *
44           ;*                                                        *
45           ;*    REVISIONS:                      DATE:               *
46           ;*                                                        *
47           ;**********************************************************
48 0000
49                  CSEG
50                  NAME        CODECI
51 0000
52                  PUBLIC      CODECI
53 0000
54                  EXTRN       CODECD,APRTRS,APRTBC,VOICEB,ENDBUF,TIMER,CNTLDT
55 0000
56           ;* PROCEDURE CODEC INTERRUPT SERVICE
57 0000
58 0000      CODECI:
```

```
59 0000
60                        ;* * SAVE ALL REGISTER THAT ARE USED
61 0000
62 0000 08                        EX      AF,AF'
63 0001 D9                        EXX
64 0002
65                        ;* * REMOVE INTERRUPT FROM PROCESSOR
66 0002
67 0002 3E 80                     LD      A,80H
68 0004 D3 00        E            OUT     (.LOW.APRTBC),A
69 0006 D3 00        E            OUT     (.LOW.APRTRS),A
70 0008
71                        ;* * IF
72                        ;* * * ( TELEPHONE ADAPTER MODE = CLEAR )
73 0008
74 0008 3A 00 00     E            LD      A,(CNTLDT)
75 0009 CB 57                     BIT     2,A
76 000B C2 1D 00     C            JP      NZ,CIPHER
77 0010
78                        ;* * AND
79                        ;* * * ( TELEPHONE ADAPTER = OFF HOOK )
80 0010
81 0010 DD CB 01 7E            BIT     7,(IX+1)
82 0014 20 07 001D              JR      NZ,CIPHER
83 0016
84                        ;* * THEN
85                        ;* * * READ CODEC RECEIVER DATA
86 0016
87 0016 DB 00        E            IN      A,(.LOW.CODECD)
88 0018
89                        ;* * * TRANSMIT RECEIVER DATA FROM CODEC
90 0018
91 0018 D3 00        E            OUT     (.LOW.CODECD),A
92 001A C3 53 00     C            JP      EXIT
93 001D
94                        ;* * ELSE
95 001D
96 001D                  CIPHER:
97 001D
98                        ;* * * IF
99                        ;* * * * CODEC RECEIVE FLAG = TRUE
100 001D
101 001D DD CB 00 4E           BIT     1,(IX)
102 0021 CA 35 00    C            JP      Z,CHKXMT
103 0024
104                       ;* * * THEN
105                       ;* * * * READ CODEC RECEIVER DATA
106 0024
107 0024 DB 00       E            IN      A,(.LOW.CODECD)
108 0026
109                       ;* * * * STORE DATA IN VOICE BUFFER
110 0026
111 0026 12                       LD      (DE),A
112 0027
113                       ;* * * * IF
114                       ;* * * * * POINTER = END OF BUFFER MEMORY
115 0027
116 0027 B7                       OR      A
```

```
117 0028 21 00 00      E          LD     HL,ENDBUF
118 002B ED 52                    SBC    HL,DE
119 002D 20 05 0034               JR     NZ,INCONE
120 002F
121                         ;* * * THEN
122                         ;* * * * POINTER = BEGINNING OF BUFFER
123 002F
124 002F 11 00 00      E          LD     DE,VOICEB
125 0032 18 01 0035               JR     CHKXMT
126 0034
127                         ;* * * ELSE
128 0034
129 0034                    INCONE:
130 0034
131                         ;* * * * POINTER = POINTER + 1
132 0034
133 0034 13                       INC    DE
134 0035
135                         ;* * * END IF
136                         ;* * * END IF
137 0035
138 0035                    CHKXMT:
139 0035
140                         ;* * * IF
141                         ;* * * * ( TRANSMIT FLAG = TRUE )
142 0035
143 0035 DD CB 00 46             BIT    0,(IX)
144 0039 28 18 0053               JR     Z,EXIT
145 003B
146                         ;* * * AND
147                         ;* * * * ( FRONT POINTER <> BACK POINTER )
148 003B
149 003B B7                       OR     A
150 003C 62                       LD     H,D
151 003D 6B                       LD     L,E
152 003E ED 42                    SBC    HL,BC
153 0040 28 11 0053               JR     Z,EXIT
154 0042
155                         ;* * * THEN
156                         ;* * * * TRANSMIT BYTE OF VOICE DATA
157 0042
158 0042 0A                       LD     A,(BC)
159 0043 D3 00       E            OUT    (.LOW.CODECD),A
160 0045
161                         ;* * * * IF
162                         ;* * * * * POINTER = END OF BUFFER MEMORY
163 0045
164 0045 B7                       OR     A
165 0046 21 00 00     E           LD     HL,ENDBUF
166 0049 ED 42                    SBC    HL,BC
167 004B 20 05 0052               JR     NZ,INCREM
168 004D
169                         ;* * * * THEN
170                         ;* * * * * POINTER = BEGINNING OF BUFFER
171 004D
172 004D 01 00 00     E           LD     BC,VOICEB
173 0050 18 01 0053               JR     EXIT
174 0052
```

```
175                      ;* * * * ELSE
176 0052
177 0052                 INCREM:
178 0052
179                      ;* * * * * POINTER = POINTER + 1
180 0052
181 0052 03                      INC    BC
182 0053
183                      ;* * * * END IF
184                      ;* * * END IF
185                      ;* * END IF
186 0053
187 0053                 EXIT:
188 0053
189                      ;* * SOFTWARE TIMER = SOFTWARE TIMER + 1
190 0053
191 0053 2A 00 00     E          LD     HL,(TIMER)
192 0056 23                      INC    HL
193 0057 22 00 00     E          LD     (TIMER),HL
194 005A
195                      ;* * RESTORE PROCESSOR REGISTERS
196 005A
197 005A 08                      EX     AF,AF'
198 005B D9                      EXX
199 005C
200                      ;* * ENABLE INTERRUPT FROM CODEC COUNTER
201 005C
202 005C FB                      EI
203 005D
204                      ;* END PROCEDURE
205 005D
206 005D C9                      RET
207 005E
208 005E                         END

ERRORS = 0000

APRTRC E 0002   APRTRS E 0001   CHKXMT C 0035   CIPHER C 001D
CNTLDT E 0006   CODECO E 0000   CODECI C 0000   ENDBUF E 0004
EXIT   C 0053   INCONE C 0034   INCREM C 0052   MEMORY M 0000
STACK  S 0000   TIMER  E 0005   VOICE  E 0003

1 0000                   TITLE          'CLOCK INTERRUPT SER
2                ;***************************************************
3                ;*                                                  *
4                ;*      NAME: CLOCK INTERRUPT SERVICE ROUTINE   PPS REF  *
5                ;*                                                  *
6                ;*      FILENAME: CLOCKI.SRC                        *
7                ;*                                                  *
8                ;*      FUNCTION: THIS ROUTINE CHECKS A BIT COUNTER TO SEE WHERE THE TRANS- *
9                ;*                MISSION IS IN THE BIT PATTERN. IT THEN EXTRACTS THE PROPER *
10               ;*                BIT FROM THE CONTROL DATA AREA IN MEMORY AND OUTPUTS IT ON *
11               ;*                THE CONTROL DATA OUT LINE. THE CURRENT POSITION IN THE    *
12               ;*                DISPLAY DATA STREAM IS THEN CALCULATED AND THE DISPLAY BIT *
13               ;*                IS READ FROM THE DISPLAY DATA LINE.                       *
```

```
14      ;*
15      ;*     METHOD:                                                              *
16      ;*                                                                          *
17      ;*     INPUT PARAMETERS:                                                    *
18      ;*     NAME    DESCRIPTION                    TYPE    LENGTH    RANGE       *
19      ;*                                                                          *
20      ;*     NONE                                                                 *
21      ;*                                                                          *
22      ;*     OUTPUT PARAMETERS:                                                   *
23      ;*     NAME    DESCRIPTION                    TYPE    LENGTH    RANGE       *
24      ;*                                                                          *
25      ;*     NONE                                                                 *
26      ;*                                                                          *
27      ;*     DATA ACCESSED OF ALTERED EXTERNAL TO MODULE:                         *
28      ;*     NAME    DESCRIPTION             TYPE     LENGTH    RANGE    DIRECTION *
29      ;*                                                                          *
30      ;*     BITNUM  BIT POSITION IN DATA    INTEGER  3 BITS    0-7      BOTH     *
31      ;*     RSTCLK  RESET CLOCK INT LINE    BOOLEAN  1 BIT     N/A      OUTPUT   *
32      ;*     CNTLDT  SYSTEM CONTROL DATA     RECORD   3 BYTES   N/A      OUTPUT   *
33      ;*     DISPLY  DISPLAY DATA FROM VP    RECORD   2 BYTES   N/A      OUTPUT   *
34      ;*     CLKFLT  CLOCK FAULT TIMER       INTEGER  1 BYTE    0-255    OUTPUT   *
35      ;*     CNLDTA  CONTROL DATA OUT LINE   BOOLEAN  1 BIT     N/A      OUTPUT   *
36      ;*     DPYDTA  DISPLAY DATA IN LINE    BOOLEAN  1 BIT     N/A      INPUT    *
37      ;*                                                                          *
38      ;*     RESTRICTIONS:                                                        *
39      ;*                                                                          *
40      ;*     SUPPORTING MODULES: NONE                                             *
41      ;*                                                                          *
42      ;*     COPYRIGHT 1983  ROCKWELL INTERNATIONAL                               *
43      ;*     COLLINS TELECOMMUNICATIONS PRODUCTS DIVISION                         *
44      ;*                                                                          *
45      ;*     AUTHOR: D.E. EICHER                DATE: 11/11/83                    *
46      ;*                                                                          *
47      ;*     VERSION: 1.0                                                         *
48      ;*                                                                          *
49      ;*     REVISIONS:                         DATE:                             *
50      ;*
51      ;*********************************************************************
52 0000
53              CSEG
54              NAME        CLOCKI
55 0000
56              PUBLIC      CLOCKI
57 0000
58              EXTRN       APRTAS,APRTAC,APRTBC,APRTBS,BITNUM,CNTLDT,APRTC
59              EXTRN       DISPLY,APRTCC,APRTCS,CLKFLT
60 0000
61      ;* PROCEDURE CLOCK INTERRUPT SERVICE
62 0000
63 0000 CLOCKI:
64 0000
65      ;* * SAVE PROCESSOR REGISTERS
66 0000
67 0000 F5      PUSH    AF
68 0001 E5      PUSH    HL
69 0002 C5      PUSH    BC
70 0003 D5      PUSH    DE
71 0004
```

```
 72                    ;* * RESET INTERRUPT FLIP-FLOP
 73 0004
 74 0004 3E 40                 LD      A,40H
 75 0006 D3 00     E           OUT     (.LOW.APRTBC),A
 76 0008 D3 00     E           OUT     (.LOW.APRTBS),A
 77 000A
 78                    ;* * ENABLE INTERRUPTS
 79 000A
 80 000A FB                    EI
 81 000B
 82                    ;* * CLOCK FAULT TIMER = 20
 83 000B
 84 000B 21 00 00   E          LD      HL,CLKFLT
 85 000E 36 14                 LD      (HL),20
 86 0010
 87                    ;* * LOAD BIT NUMBER TO TRANSMIT
 88 0010
 89 0010 3A 00 00   E          LD      A,(BITNUM)
 90 0013
 91                    ;* * BYTE NUMBER = BIT COUNT / 8
 92 0013
 93 0013 0F                    RRCA
 94 0014 0F                    RRCA
 95 0015 0F                    RRCA
 96 0016
 97                    ;* * DATA ADDRESS = CONTROL DATA + BYTE NUMBER
 98 0016
 99 0016 E6 03                 AND     03H
100 0018 4F                    LD      C,A
101 0019 06 00                 LD      B,0
102 001B 21 00 00   E          LD      HL,CNTLDT
103 001E 09                    ADD     HL,BC
104 001F
105                    ;* * ROTATE COUNT = BIT NUMBER
106 001F
107 001F 3A 00 00   E          LD      A,(BITNUM)
108 0022 E6 07                 AND     07H
109 0024 47                    LD      B,A
110 0025 87                    OR      A
111 0026
112                    ;* * LOAD CONTROL DATA BIT MASK
113 0026
114 0026 3E 80                 LD      A,80H
115 0028
116                    ;* * DO WHILE ROTATE COUNT <> 00
117 0028
118 0028 28 05 002F    ROTATE: JR      Z,OUTDAT
119 002A
120                    ;* * * SHIFT DATA INTO POSITION
121 002A
122 002A 0F                    RRCA
123 002B
124                    ;* * * ROTATE COUNT = ROTATE COUNT - 1
125 002B
126 002B 05                    DEC     B
127 002C
128                    ;* * END WHILE
```

```
 129 002C
 130 002C C3 28 00     C              JP     ROTATE
 131 002F
 132                                  ;* * TRANSMIT A BIT OF DATA TO VP-110
 133 002F
 134 002F                             OUTDAT:
 135 002F
 136                                  ;* * SAVE BIT MASK FOR DISPLAY DATA
 137 002F
 138 002F 47                          LD     B,A
 139 0030
 140                                  ;* * TRANSFER BIT TO ACCUMULATOR
 141 0030
 142 0030 A6                          AND    (HL)
 143 0031
 144                                  ;* * LOAD BIT MASK FOR OUTPUT OF DATA
 145 0031
 146 0031 3E 01                       LD     A,01H
 147 0033
 148                                  ;* * IF
 149                                  ;* * * CONTROL DATA BIT = LOGIC 1
 150 0033
 151 0033 28 05 003A                  JR     Z,ZERODT
 152 0035
 153                                  ;* * THEN
 154                                  ;* * * CLEAR CONTROL DATA LINE LOW
 155 0035
 156 0035 D3 00        E              OUT    (.LOW.APRTBC),A
 157 0037 C3 3C 00     C              JP     CONTIN
 158 003A
 159                                  ;* * ELSE
 160 003A
 161 003A                             ZERODT:
 162 003A
 163                                  ;* * * SET CONTROL DATA LINE HIGH
 164 003A
 165 003A D3 00        E              OUT    (.LOW.APRTBS),A
 166 003C
 167                                  ;* * END IF
 168 003C
 169 003C                             CONTIN:
 170 003C
 171                                  ;* * CALCULATE DIFFERENCE BETWEEN DISPLAY AND CONTROL DATA
 172 003C
 173 003C 11 03 00                    LD     DE,3
 174 003F 19                          ADD    HL,DE
 175 0040
 176                                  ;* * READ DISPLAY DATA BIT
 177 0040
 178 0040 DB 00        E              IN     A,(.LOW.APRTB)
 179 0042 4F                          LD     C,A
 180 0043
 181                                  ;* * IF
 182                                  ;* * * DISPLAY DATA BIT = LOGIC 1
 183 0043
 184 0043 CB 47                       BIT    0,A
 185 0045 78                          LD     A,B
 186 0046 CA 4D 00     C              JP     Z,CLRBIT
```

```
187 0049
188                          ;* * THEN
189                          ;* * * SET BIT IN DISPLAY DATA
190 0049
191 0049 B6                         OR      (HL)
192 004A C3 4F 00    C              JP      SAVEDT
193 004D
194                          ;* * ELSE
195 004D
196 004D                     CLRBIT:
197 004D
198                          ;* * * CLEAR BIT IN DISPLAY DATA
199 004D
200 004D 2F                         CPL
201 004E A6                         AND     (HL)
202 004F
203                          ;* * END IF
204 004F
205 004F                     SAVEDT:
206 004F
207                          ;* * STORE DISPLAY DATA IN MEMORY
208 004F
209 004F 77                          LD      (HL),A
210 0050
211                          ;* * MESSAGE BIT NUMBER = MESSAGE BIT NUMBER + 1
212 0050
213 0050 21 00 00    E              LD      HL,BITNUM
214 0053 34                         INC     (HL)
215 0054
216                          ;* * IF
217                          ;* * * MESSAGE BIT NUMBER > 23
218 0054
219 0054 7E                         LD      A,(HL)
220 0055 FE 18                      CP      24
221 0057 FA 5C 00    C              JP      M,EXIT
222 005A
223                          ;* * THEN
224                          ;* * * MESSAGE BIT NUMBER = 00
225 005A
226 005A 36 00                      LD      (HL),00
227 005C
228                          ;* * END IF
229 005C
230 005C                     EXIT:
231 005C
232                          ;* * IF
233                          ;* * * FILL CLOCK ENABLE FLAG = TRUE
234 005C
235 005C 21 01 00    E              LD      HL,DISPLY+1
236 005F CB 66                      BIT     4,(HL)
237 0061 CA 68 00    C              JP      Z,QUIT
238 0064
239                          ;* * THEN
240                          ;* * * FILL CLOCK ENABLE LINE = ACTIVE
241 0064
242 0064 3E 20                      LD      A,20H
243 0066 D3 00       E              OUT     (.LOW.APRTBC),A
244 0068
245                          ;* * END IF
```

```
246 0068
247 0068                    QUIT:
248 0068
249                         ;* * RESTORE PROCESSOR REGISTERS
250 0068
251 0068 D1                         POP     DE
252 0069 C1                         POP     BC
253 006A E1                         POP     HL
254 006B F1                         POP     AF
255 006C
256                         ;* END PROCEDURE
257 006C
258 006C C9                         RET
259 006D
260 006D                            END
```

ERRORS = 0000

```
APRTAC  E 0001   APRTAS E 0000   APRTBC E 0002   APRTBS E 0003
APRTC   E 0006   APRTCC E 0008   APRTCS E 0007   BITNUM E 0004
CLKFLT  E 000A   CLOCKI C 0000   CLRBIT C 004D   CNTLDT E 0005
CONTIN  C 003C   DISPLY E 0007   EXIT   C 005C   MEMORY M 0000
OUTDAT  C 002F   QUIT   C 0068   ROTATE C 0028   SAVEDT C 004F
STACK   S 0000   ZERODT C 003A
```

```
 1 0000                     TITLE           'RAM DEFINITIONS
 2                  ;*************************************************************
 3                  ;*                                                           *
 4                  ;*      NAME: RAM DEFINITIONS                   PPS REF  N/A *
 5                  ;*                                                           *
 6                  ;*      FILENAME: RAMDEF.SRC                                 *
 7                  ;*                                                           *
 8                  ;*      FUNCTION: DEFINE STORAGE ALLOCATION AND DEFINE CONSTANTS FOR THE EN- *
 9                  ;*                TIRE PROGRAM PEACE9.                       *
10                  ;*                                                           *
11                  ;*      METHOD:                                              *
12                  ;*                                                           *
13                  ;*      INPUT PARAMETERS:                                    *
14                  ;*      NAME    DESCRIPTION             TYPE    LENGTH  RANGE *
15                  ;*                                                           *
16                  ;*      NONE                                                 *
17                  ;*                                                           *
18                  ;*      OUTPUT PARAMETERS:                                   *
19                  ;*      NAME    DESCRIPTION             TYPE    LENGTH  RANGE *
20                  ;*                                                           *
21                  ;*      NONE                                                 *
22                  ;*                                                           *
23                  ;*      DATA ACCESSED OR ALTERED EXTERNAL TO MODULE:         *
24                  ;*      NAME    DESCRIPTION     TYPE    LENGTH  RANGE  DIRECTION*
25                  ;*                                                           *
26                  ;*      N/A                                                  *
27                  ;*                                                           *
28                  ;*      RESTRICTIONS:                                        *
29                  ;*                                                           *
30                  ;*      SUPPORTING MODULES: NONE                             *
31                  ;*
```

```
32              ;*   COPYRIGHT 1983 ROCKWELL INTERNATIONAL                          *
33              ;*   COLLINS TELECOMMUNICATIONS PRODUCTS DIVISION                    *
34              ;*                                                                   *
35              ;*   AUTHOR: D.E. EICHER                    DATE: 11/11/83           *
36              ;*                                                                   *
37              ;*   VERSION: 1.0                                                    *
38              ;*                                                                   *
39              ;*   REVISION:                              DATE:                    *
40              ;*                                                                   *
41              ;*********************************************************************
42 0000
43                      DSEG
44                      NAME            RAMDEF
45 0000
46                      PUBLIC          APRTA,APRTB,APRTC,CODECC,CODECD,INTMSK,VOICER,FRONTR
47                      PUBLIC          ENDBUF,TIMER,BACKBF,CODFLG,INITAA,INITAB,INITAC,ADDRA
48                      PUBLIC          APRTAC,APRTAS,APRTBC,APRTBS,APRTCC,APRTCS,STCK,VXTIME
49                      PUBLIC          CNTLDT,DISPLY,CNTLBF,SWTIME,SYSSTS,BITNUM,HOKTIM
50                      PUBLIC          T0LOW,T0HIGH,T1LOW,T1HIGH,T0CMD,T1CMD,START0,START1
51                      PUBLIC          STOP0,STOP1,VOXDLY,FACTOR,XMTTIM,TRIGGR,CLKFLT
52 0000

53              ;***** SYSTEM MASTER FLAG STORAGE AREA *****************************
54 0000
55 0000         CODFLG: DS              2               ;MAIN SYSTEM STATUS AND FLAG STORAGE
56 0002

57              ;***** VARIABLE AND POINTER STORAGE  *******************************
58 0002
59 0002         INTMSK: DS              1
60 0003         HOKTIM: DS              2               ;DELAY TIMER TO PTT WHEN OFF HOOK
61 0005         TIMER:  DS              2
62 0007         FRONTB: DS              2
63 0009         BACKBF: DS              2
64 000B

65              ;***** VOX FUNCTION VARIABLE STORAGE *******************************
66 000B
67 000B         VXTIME: DS              2               ;TIMER FOR VOX ISSUED PTT
68 000D         VOXDLY: DS              2               ;TIME INTERVAL BEFORE RELEASE OF PTT
69 000F         FACTOR: DS              2               ;ARITHMETICALLY DERIVED DELAY FACTOR
70 0011         XMTTIM: DS              2               ;TIME UNTIL VOICE STARTS AFTER PTT
71 0013         TRIGGR: DS              1               ;TIME DURATION OF VOX TRIGGER PULSES
72 0014

73              ;***** CONTROL DATA FOR VP-110 COMMUNICATION ***********************
74 0014
75 0014         CNTLDT: DS              3               ;CONTROL MESSAGE TO VP-110
76 0017         DISPLY: DS              3               ;DISPLAY DATA FROM VP-110
77 001A         SYSSTS: DS              1               ;TA FRONT PANEL SWITCH STATUS
78 001B         CNTLBF: DS              1               ;TA FRONT PANEL SWITCH DATA
79 001C         SWTIME: DS              2               ;SWITCH DEBOUNCE TIMER STORAGE
80 001E         BITNUM: DS              1               ;MESSAGE BIT POSITION
81 001F         CLKFLT: DS              1               ;CONTROL ALARM IF 425 HZ CLOCK STOPS
82 0020
```

```
83              ;***** VOICE STORAGE BUFFER  *******************************************
84 0020
85 0020         VOICEB: DS          1900
86 078C         ENDBUF: DS          1
87 078D

88              ;***** STACK STORAGE AREA    *******************************************
89 078D
90 078D                 DS          CODFLG+2047-ENDBUF      ;CALCULATE INITIAL
91                                                          ;STACK POINTER VALUE FROM THIS
92 0800         STCK:   DS          1                       ;INITIAL STACK VALUE === 800H
93 0801
94 0801

95              ;***** NSC810 INITIALIZATION DATA  *************************************
96 0801
97 0080         INITAA  EQU         80H                     ;N810A PORT A ALL INPUTS
98 00E7         INITAB  EQU         0E7H                    ;N810A PORT B
99 000E         INITAC  EQU         0EH                     ;N810A PORT C
100 0801

101             ;       *** NSC810 R/W ADDRESSES ***
102 0801
103 00C0        APRTA   EQU         0C0H                    ;N810A PORT A
104 00C1        APRTB   EQU         0C1H                    ;N810A PORT B
105 00C2        APRTC   EQU         0C2H                    ;N810A PORT C
106 0801

107             ;       *** NSC810C BIT SET/CLEAR ADDRESSES ***
108 0801
109 00C8        APRTAC  EQU         0C8H                    ;PORT A BIT CLEAR
110 00CC        APRTAS  EQU         0CCH                    ;PORT A BIT SET
111 00C9        APRTBC  EQU         0C9H                    ;PORT B BIT CLEAR
112 00CD        APRTBS  EQU         0CDH                    ;PORT B BIT SET
113 00CA        APRTCC  EQU         0CAH                    ;PORT C BIT CLEAR
114 00CE        APRTCS  EQU         0CEH                    ;PORT C BIT SET
115 0801

116             ;       *** NSC810A DATA DIRECTION ADDRESS ***

117 0801
118 00C4        ADDRA   EQU         0C4H                    ;NSC810A DDR PORT A
119 0801
120             ;       *** NSC810A TIMER ADDRESS DEFINITIONS ***
121 0801
122 00D0        T0LOW   EQU         0D0H                    ;TIMER 0 LOW VALUE
123 00D1        T0HIGH  EQU         0D1H                    ;TIMER 0 HIGH VALUE
```

```
124 00D2            T1LOW    EQU    0D2H         ;TIMER 1 LOW VALUE
125 00D3            T1HIGH   EQU    0D3H         ;TIMER 1 HIGH VALUE
126 00D8            T0CMD    EQU    0D8H         ;TIMER 0 COMMAND REGISTER
127 00D9            T1CMD    EQU    0D9H         ;TIMER 1 COMMAND REGISTER
128 00D5            START0   EQU    0D5H         ;TIMER 0 START REGISTER
129 00D7            START1   EQU    0D7H         ;TIMER 1 START REGISTER
130 00D4            STOP0    EQU    0D4H         ;TIMER 0 STOP REGISTER
131 00D6            STOP1    EQU    0D6H         ;TIMER 1 STOP REGISTER
132 0001
133                 ;   *** CODEC CONTROL AND DATA ADDRESSES ***
134 0001
135 0090            CODECD   EQU    090H         ;CODEC DATA PORT
136 0091            CODECC   EQU    091H         ;CODEC CONTROL PORT
137 0001
138 0001                     END

ERRORS = 0000

ADDRA   00C4    APRTA    00C0   APRTAL  00C8   APRTAS   00CC
APRTB   00C1    APRTBC   00C9   APRTBS  00CD   APRTC    00C2
APRTCC  00CA    APRTCS   00CE   BACKBF D 0009   BITNUM D 001E
CLKFLT D 001F   CNTLBF D 001B   CNTLDT D 0014   CODECC   0091
CODECD  0090    CODFLG D 0000   DISPLY D 0017   ENDBUF D 078C
FACTOR D 000F   FRONTB D 0007   HOKTIM D 0003   INITAA   0080
INITAB  00E7    INITAC   000E   INTMSK D 0002   MEMORY M 0000
STACK  S 0000   START0   00D5   START1   00D7   STCK   D 0800
STOP0   00D4    STOP1    00D6   SWTIME D 001C   SYSSTS D 001A
T0CMD   00D8    T0HIGH   00D1   T0LOW    00D0   T1CMD    00D9
T1HIGH  00D3    T1LOW    00D2   TIMER  D 0005   TRIGGR D 0013
VOICEB D 0020   VOXDLY D 000B   VXTIME D 000B   XMTTIM D 0011
```

What is claimed is:

1. A method of voice operated transmit control (VOX) for an electronic transceiver, comprising the steps of:
   converting audio energy into a corresponding electronic analog signal;
   generating a delayed digital signal corresponding to said analog signal;
   generating an anti-VOX signal corresponding to a signal received by the transceiver;
   comparing said analog signal with said anti-VOX signal and generating a trigger signal comprising a function of said analog signal and said anti-VOX signal;
   programmably analyzing said trigger signal to detect a wave shape corresponding to a voice component of said audio energy;
   providing a keying signal upon detection of said wave shape to enable transmission of said delayed digital signal by the transceiver; and
   feeding back said keying signal to inhibit generation of said anti-VOX signal during transmission of said delayed digital signal by the transceiver.

2. A method of voice operated transmit control (VOX) for an electronic transceiver, comprising the steps of:
   providing an analog signal corresponding to audio energy;
   generating a delayed digital signal corresponding to said analog signal;
   providing an anti-VOX signal corresponding to a signal received by the transceiver;
   comparing said analog signal with said anti-VOX signal;
   generating a trigger signal having a logic level based on the comparison of said analog and anti-VOX signals;
   analyzing said trigger signal to detect a wave shape indicative of a voice component of said audio energy;
   providing a keying signal upon detection of said wave shape to enable transmission of said delayed digital signal by the transceiver; and
   inhibiting said anti-VOX signal during transmission of said delayed digital signal.

* * * * *